(12) United States Patent
Shin et al.

(10) Patent No.: US 12,371,443 B2
(45) Date of Patent: Jul. 29, 2025

(54) TRANSITION METAL COMPOUND, CATALYST COMPOSITION COMPRISING SAME, AND METHOD FOR PRODUCING OLEFIN POLYMER USING CATALYST COMPOSITION

(71) Applicant: SABIC SK NEXLENE COMPANY PTE. LTD., Singapore (SG)

(72) Inventors: Dongcheol Shin, Daejeon (KR); Yeonock Oh, Daejeon (KR); Minji Kim, Daejeon (KR); Miji Kim, Daejeon (KR); Sang Bae Cheong, Daejeon (KR); Dongkyu Park, Daejeon (KR); Choon Sik Shim, Sejong-si (KR); Minho Jeon, Daejeon (KR); Dae Ho Shin, Daejeon (KR)

(73) Assignee: SABIC SK NEXLENE COMPANY PTE. LTD., Singapore (SG)

( * ) Notice: Subject to any disclaimer, the term of this patent is extended or adjusted under 35 U.S.C. 154(b) by 625 days.

(21) Appl. No.: 17/756,795

(22) PCT Filed: Dec. 1, 2020

(86) PCT No.: PCT/IB2020/061300
§ 371 (c)(1),
(2) Date: Jun. 2, 2022

(87) PCT Pub. No.: WO2021/111282
PCT Pub. Date: Jun. 10, 2021

(65) Prior Publication Data
US 2023/0091228 A1    Mar. 23, 2023

(30) Foreign Application Priority Data

Dec. 3, 2019 (KR) .................. 10-2019-0159015
Nov. 30, 2020 (KR) .................. 10-2020-0164792

(51) Int. Cl.
| | | |
|---|---|---|
| C08F 4/6592 | (2006.01) |
| C07F 5/02 | (2006.01) |
| C07F 5/06 | (2006.01) |
| C07F 7/00 | (2006.01) |
| C07F 7/08 | (2006.01) |
| C07F 17/00 | (2006.01) |

(52) U.S. Cl.
CPC .................. *C07F 7/00* (2013.01); *C07F 5/02* (2013.01); *C07F 5/06* (2013.01); *C07F 7/08* (2013.01); *C08F 4/6592* (2013.01)

(58) Field of Classification Search
None
See application file for complete search history.

(56) References Cited

U.S. PATENT DOCUMENTS

| | | |
|---|---|---|
| 6,900,343 B1 | 5/2005 | Bingel et al. |
| 2004/0158010 A1 | 8/2004 | Lehmus et al. |
| 2010/0137624 A1 | 6/2010 | Ralf-Alexander |

FOREIGN PATENT DOCUMENTS

| | | |
|---|---|---|
| DE | 4130299 A1 | 3/1993 |
| EP | 0320762 A2 | 6/1989 |
| EP | 0372632 A1 | 6/1990 |
| JP | H05320236 A | 12/1993 |
| KR | 20090115740 A | 11/2009 |
| KR | 20190091543 A | 8/2019 |
| RU | 2168515 C2 | 6/2001 |
| RU | 2425061 C2 | 7/2011 |
| WO | 2018108917 A1 | 6/2018 |
| WO | 2019092525 A1 | 5/2019 |

OTHER PUBLICATIONS

ISA Korean Intellectual Property Office, International Search Report Issued in Application No. PCT/IB2020/061300, Mar. 9, 2021, WIPO, 6 pages.
European Patent Office, Extended European Search Report Issued in Application No. 20896794.3, Nov. 27, 2023, Germany, 7 pages.
Federal Institute of Industrial Property, Search Report Issued in Application No. 2022117693, Jan. 23, 2023, 6 pages.
Federal Institute of Industrial Property, Office Action Issued in Application No. 2022117693, Jan. 23, 2023, 15 pages.

*Primary Examiner* — Catherine S Branch
(74) *Attorney, Agent, or Firm* — McCoy Russell LLP

(57) ABSTRACT

The present invention provides a transition metal compound, a catalyst composition comprising same, and a method for producing an olefin polymer using the catalyst composition. A transition metal compound having a specific functional group at a specific position, according to the present invention, has high solubility and catalytic activity, and thus a method for producing an olefin polymer by using said transition metal compound can produce an olefin polymer having excellent physical properties through a simple process.

16 Claims, No Drawings

TRANSITION METAL COMPOUND, CATALYST COMPOSITION COMPRISING SAME, AND METHOD FOR PRODUCING OLEFIN POLYMER USING CATALYST COMPOSITION

CROSS REFERENCE TO RELATED APPLICATIONS

The present application is a U.S. National Phase of International Application No. PCT/IB2020/061300 entitled "TRANSITION METAL COMPOUND, CATALYST COMPOSITION COMPRISING SAME, AND METHOD FOR PRODUCING OLEFIN POLYMER USING CATALYST COMPOSITION," and filed on Dec. 1, 2020. International Application No. PCT/IB2020/061300 claims priority to Korean Patent Application No. 10-2019-0159015 filed on Dec. 3, 2019, and to Korean Patent Application No. 10-2020-0164792 filed on Nov. 30, 2020. The entire contents of each of the above-listed applications are hereby incorporated by reference for all purposes.

TECHNICAL FIELD

The following disclosure relates to a transition metal compound, a catalyst composition containing the same, and a method for preparing an olefin polymer using the same, and in particular, to a transition metal compound having improved solubility by introducing a controlled specific functional group, a catalyst composition containing the same, and a method for preparing an olefin polymer using the same.

BACKGROUND AND SUMMARY

Conventionally, a so-called Ziegler-Natta catalyst system composed of a main catalyst component of a titanium or vanadium compound and a cocatalyst component of an alkyl aluminum compound has been generally used for preparing a homopolymer of ethylene or a copolymer of ethylene and α-olefin.

The Ziegler-Natta catalyst system exhibits high activity for ethylene polymerization. However, there are disadvantages in that the resulting polymer generally has broad molecular weight distribution due to heterogeneous catalytic active site, and in particular, composition distribution of the copolymer of ethylene and α-olefin is not uniform.

Recently, a so-called metallocene catalyst system composed of a metallocene compound of transition metals of Group 4 in the periodic table, such as titanium, zirconium, hafnium, etc., and methylaluminoxane, which is a cocatalyst, has been developed. Since the metallocene catalyst system is a homogeneous catalyst having a single catalyst active site, it is characterized in that the metallocene catalyst system is capable of preparing polyethylene having a narrow molecular weight distribution and an uniform composition distribution as compared to the existing Ziegler-Natta catalyst system.

As a specific example, it was possible to prepare polyethylene having a narrow molecular weight distribution (Mw/Mn) by activating the metallocene compound such as $Cp_2TiCl_2$, $Cp_2ZrCl_2$, $Cp_2ZrMeCl$, $Cp_2ZrMe_2$, $(IndH_4)_2ZrCl_2$, etc., with the cocatalyst, methylaluminoxane to thereby polymerize ethylene with high activity.

However, it is difficult to obtain a high molecular weight polymer in the metallocene catalyst system. In particular, when the catalyst system is applied to a solution polymerization method that is carried out at a high temperature of 100° C. or more, a polymerization activity is rapidly reduced, and a β-dehydrogenation reaction predominates, and thus, it is not suitable for preparing a high molecular weight polymer having a high weight average molecular weight (Mw).

Meanwhile, it was known that as a catalyst capable of preparing a polymer having a high catalyst activity and a high molecular weight by homopolymerization of ethylene or copolymerization of ethylene and α-olefin under a solution polymerization condition of 100° C. or more, a so-called geometrically constrained ANSA-type metallocene-based catalyst in which a transition metal is linked in a ring form may be used. The ANSA-type metallocene-based catalyst has significantly improved octene-injection and high-temperature activity compared to the metallocene catalyst. Nevertheless, most of the previously known ANSA-type metallocene-based catalysts include a Cl functional group or a methyl group, and thus have a problem of having improved for use in a solution process.

Since the Cl functional group substituted on the catalyst may cause corrosion, etc. depending on the material used in the process, a study has been conducted on the ANSA-type metallocene-based catalyst substituted with dimethyl in order to avoid the problem of corrosion caused by Cl. However, the ANSA-type metallocene-based catalyst is also difficult to inject into the polymerization process due to its poor solubility. Toluene or xylene can be used to dissolve these catalysts having poor solubility, but the use of aromatic solvents such as toluene or xylene causes problems in the case of producing products that are likely to come into contact with food.

Thus, there is an urgent need for a study on a competitive catalyst having characteristics such as excellent solubility, high temperature activity, reactivity with high-grade alpha-olefins, and an ability to produce high molecular weight polymers.

DETAILED DESCRIPTION

Technical Problem

An embodiment of the present invention is directed to providing a transition metal compound to which a controlled specific functional group is introduced and a catalyst composition containing the same in order to improve the problems described above.

Another embodiment of the present invention is directed to providing a method for preparing an olefin polymer using the transition metal compound of the present invention as a catalyst.

Technical Solution

In one general aspect, there is provided a transition metal compound represented by the following Formula 1, the transition metal compound having a significantly improved solubility in a non-aromatic hydrocarbon by introducing a specific functional group:

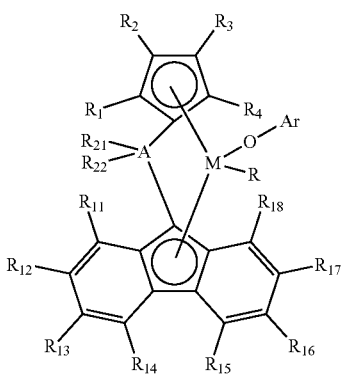

Formula 1

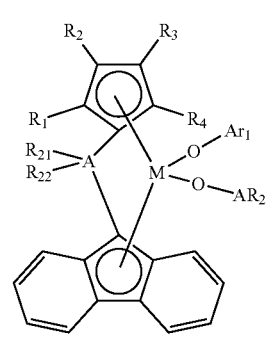

Formula 2

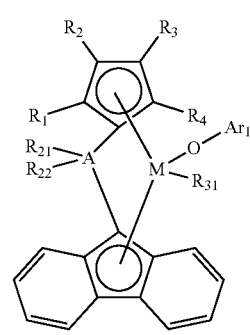

Formula 3 wherein:

M is a transition metal of Group 4 in the periodic table;

A is C or Si;

Ar is substituted aryl; and substituent of the aryl of Ar is one or more selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, and (C6-C20)arylthio and the substituted aryl of Ar have 14 or more carbon atoms;

R is (C1-C20)alkyl, (C1-C20)alkoxy, (C6-C20)aryl, or (C6-C20)aryloxy;

$R_1$ to $R_4$ are each independently hydrogen or (C1-C20) alkyl;

$R_{11}$ to $R_{18}$ are each independently hydrogen, (C1-C20) alkyl, (C1-C20)alkoxy, (C3-C20)cycloalkyl, (C6-C20) aryl, (C6-C20)aryl(C1-C20)alkyl, (C1-C20)alkyl(C6-C20)aryl, (C1-C20)alkylsilyl, or (C6-C20)arylsilyl, or each of the substituents may be linked to an adjacent substituent via (C3-C12)alkylene or (C3-C12)alkenylene with or without a fused ring to form an alicyclic ring, or a monocyclic or polycyclic aromatic ring;

$R_{21}$ and $R_{22}$ are each independently (C6-C20)aryl; and the alkyl, alkoxy, aryl and aryloxy of R, the alkyl, alkoxy, cycloalkyl, aryl, arylalkyl, alkylaryl, alkylsilyl, arylsilyl, alicyclic ring or aromatic ring of $R_{11}$ to $R_{18}$, and the aryl of $R_{21}$ and $R_{22}$ may be further substituted with one or more substituents selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20) alkylphosphine, and (C6-C20)arylphosphine.

Preferably, in Formula 1 according to an exemplary embodiment of the present invention, Ar may be (C6-C20) aryl substituted with alkyl having 8 or more carbon atoms; R may be (C1-C20)alkyl, (C1-C20)alkyl(C6-C20)aryloxy, or (C6-C20)aryl(C1-C20)alkyl, and more preferably, M may be titanium, zirconium, or hafnium; each R may be independently (C1-C4)alkyl, (C8-C20)alkyl(C6-C12)aryloxy, or (C6-C12)aryl(C1-C4)alkyl; $R_1$ to $R_4$ may be each independently hydrogen or (C1-C4)alkyl; and $R_1$ to $R_{18}$ may be hydrogen.

Preferably, the transition metal compound of Formula 1 according to an exemplary embodiment of the present invention may be represented by the following Formula 2 or 3:

wherein:

M is titanium, zirconium, or hafnium;

$Ar_1$ and $Ar_2$ are each independently substituted (C6-C20) aryl; and substituent of the (C6-C20)aryl of Ar is (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, or (C6-C20)arylthio and the substituted (C6-C20)aryl of $Ar_1$ and $Ar_2$ have 14 or more carbon atoms;

A is C or Si;

$R_1$ to $R_4$ are each independently hydrogen or (C1-C4) alkyl;

$R_{21}$ and $R_{22}$ are each independently (C6-C20)aryl or (C6-C20)aryl substituted with (C1-C4)alkyl; and $R_{31}$ is (C1-C20)alkyl or (C1-C20)alkyl(C6-C20)aryl.

Specifically, the transition metal compound of the present invention may be selected from the following compounds:

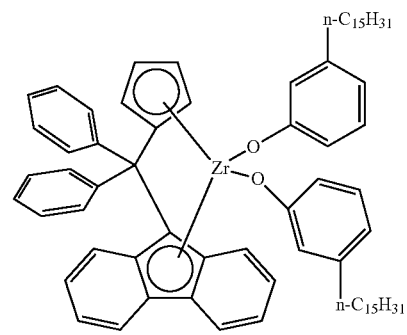

-continued
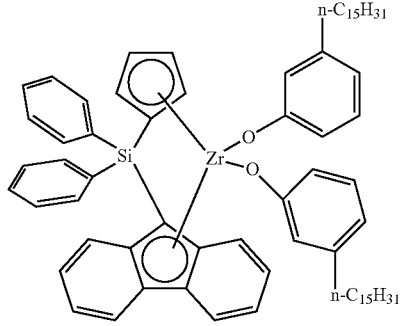
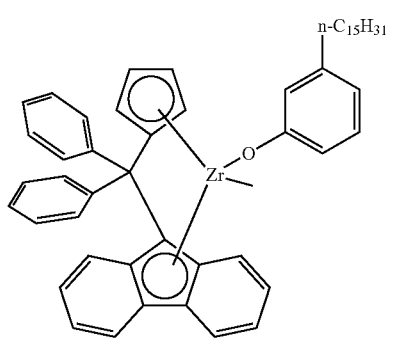
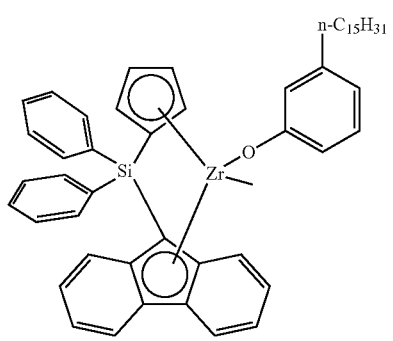
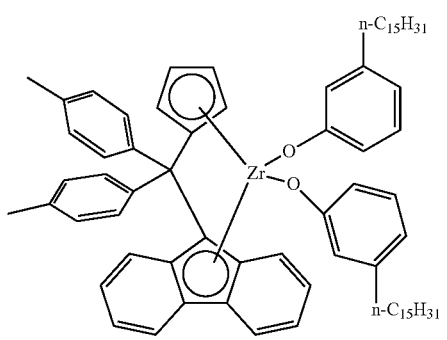
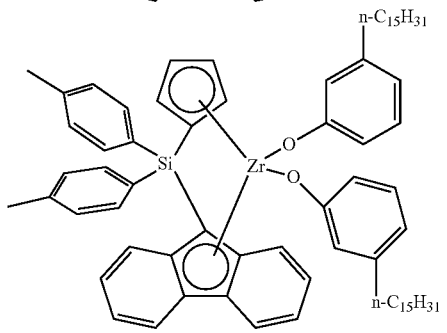
-continued
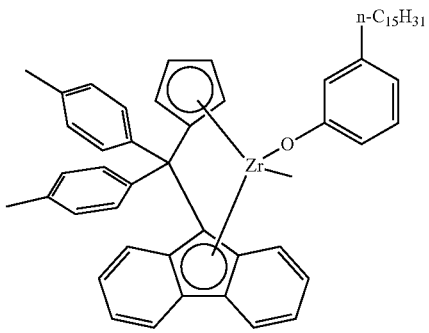
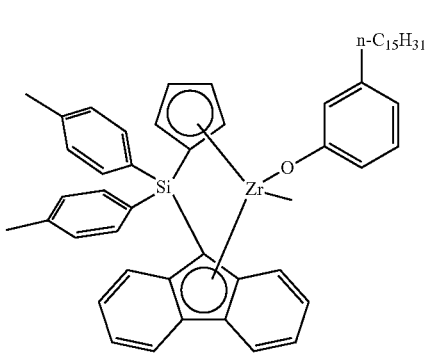
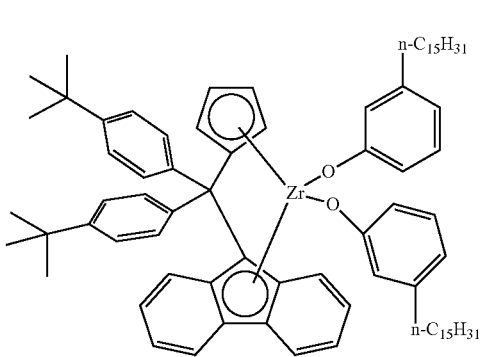
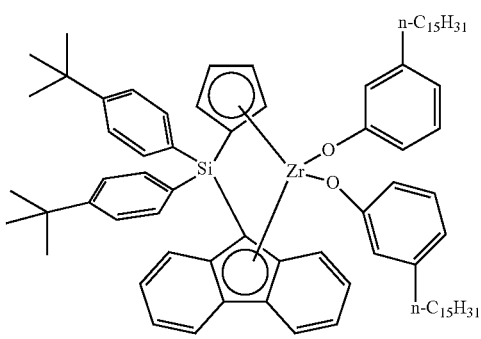
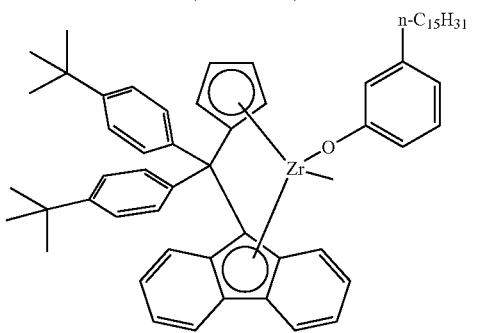

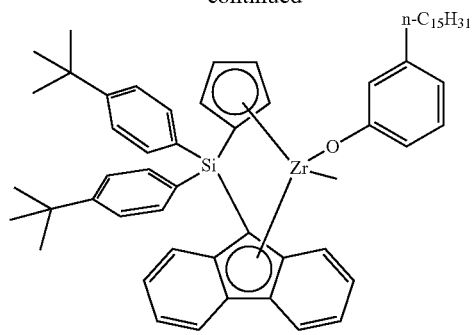
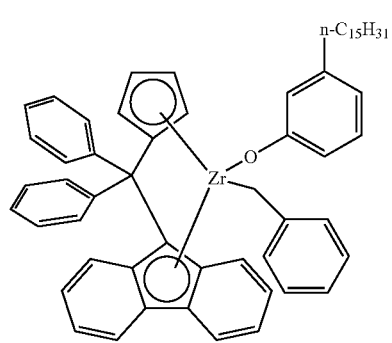
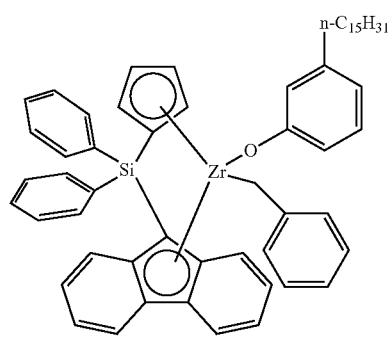
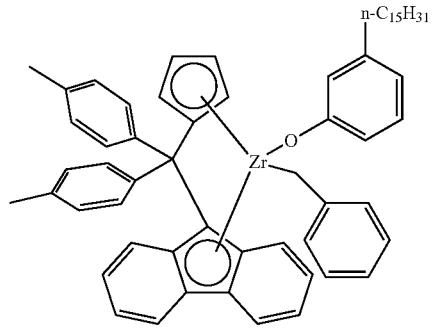
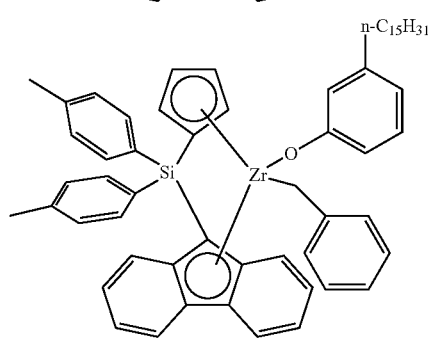
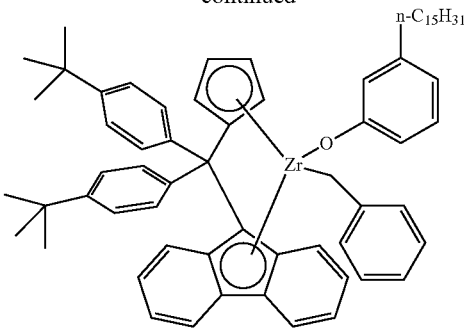
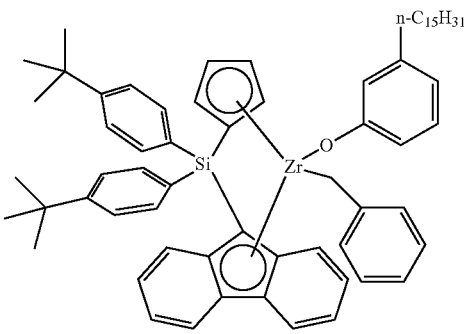
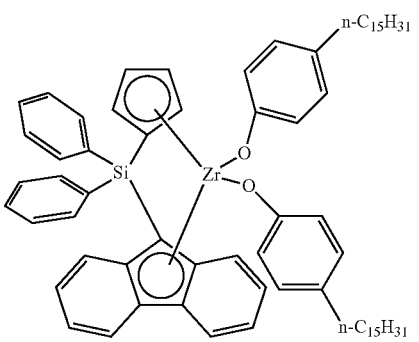
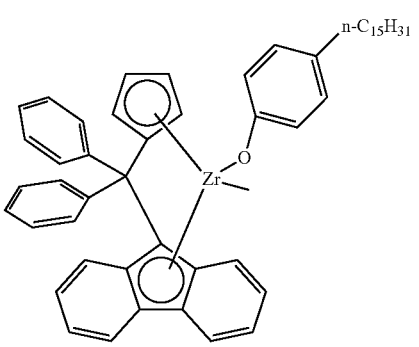
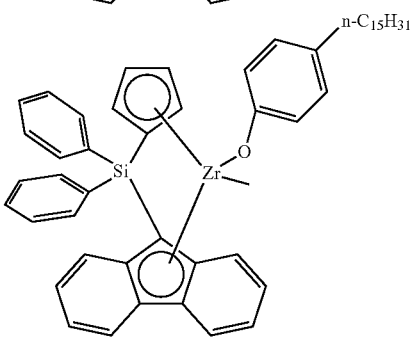

-continued

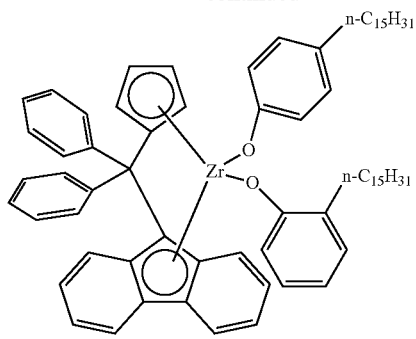

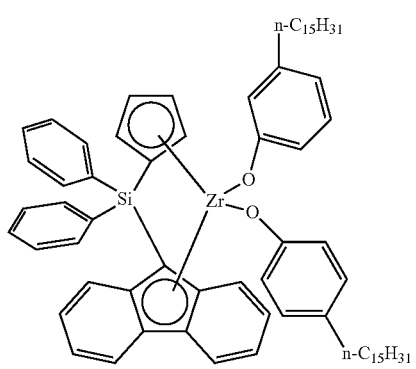

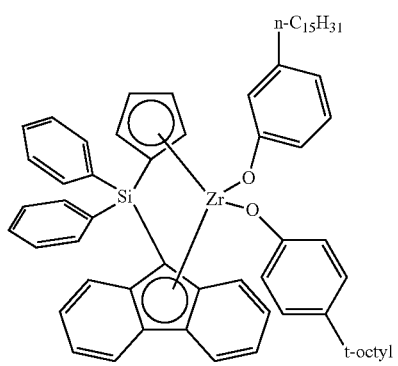

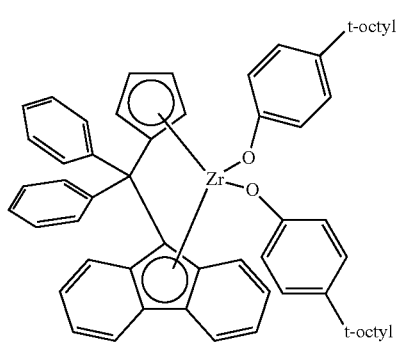

-continued

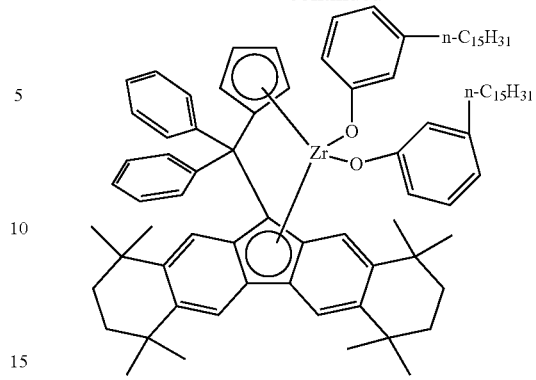

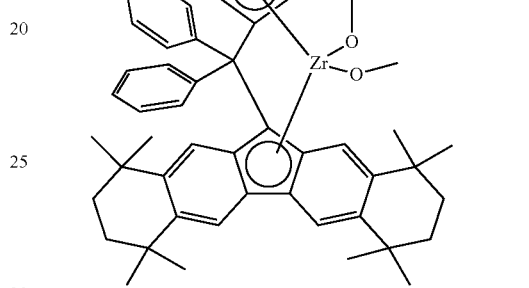

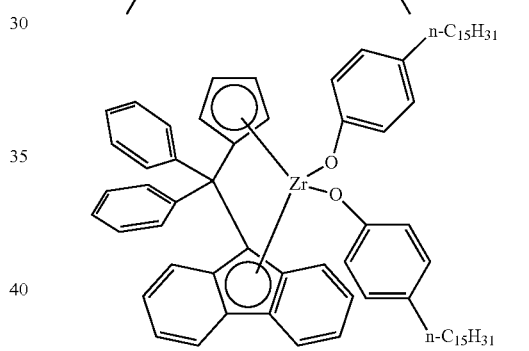

Preferably, the transition metal compound according to an exemplary embodiment of the present invention may have a solubility of 1% by weight or more (solvent: methylcyclohexane) at 25° C.

In another general aspect, there is provided a transition metal catalyst composition for preparing a homopolymer of ethylene or a copolymer of ethylene and alpha-olefin, containing the transition metal compound according to the present invention, wherein the transition metal catalyst composition according to the present invention contains a transition metal compound represented by Formula 1; and a cocatalyst.

The cocatalyst contained in the transition metal catalyst composition according to the present invention may be an aluminum compound cocatalyst, a boron compound cocatalyst, or a mixture thereof.

In addition, the present invention provides a method for preparing an olefin polymer using the transition metal compound according to the present invention.

In another general aspect, a method for preparing an olefin polymer according to the present invention includes: obtaining an olefin polymer by solution polymerization of one or two or more monomers selected from ethylene and a comonomer in the presence of a transition metal compound represented by Formula 1, a cocatalyst, and a non-aromatic hydrocarbon solvent.

The transition metal catalyst composition according to an exemplary embodiment of the present invention may have a solubility of 1% by weight or more in the non-aromatic hydrocarbon solvent (solvent: methylcyclohexane) at 25° C.

Preferably, in the method for preparing an olefin polymer according to the present invention, the cocatalyst may be an aluminum compound cocatalyst, a boron compound cocatalyst, or a mixture thereof, and specifically, the boron compound cocatalyst may be a compound represented by the following Formulas 11 to 14, and the aluminum compound cocatalyst may be represented by the following Formulas 15 to 19:

Formula 11

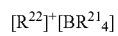

Formula 12

Formula 13

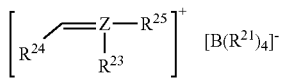

Formula 14 wherein B is a boron atom; $R^{21}$ is a phenyl group, and the phenyl group may be further substituted with 3 to 5 substituents selected from the group consisting of a fluorine atom, a (C1-C20)alkyl group, a (C1-C20)alkyl group substituted with a fluorine atom, a (C1-C20)alkoxy group, or a (C1-C20)alkoxy group substituted with a fluorine atom; $R^{22}$ is a (C5-C7) aromatic radical, a (C1-C20)alkyl(C6-C20)aryl radical or a (C6-C20)aryl(C1-C20)alkyl radical; Z is nitrogen or a phosphorus atom; $R^{23}$ is a (C1-C20)alkyl radical or an anilinium radical substituted with two (C1-C10)alkyl groups together with a nitrogen atom; $R^{24}$ is a (C5-C20)alkyl group; $R^{25}$ is a (C5-C20)aryl group or a (C1-C20)alkyl(C6-C20)aryl group; and p is an integer of 2 or 3.

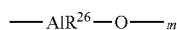

Formula 15

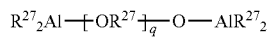

Formula 16

Formula 17

Formula 18

Formula 19 wherein $R^{26}$ and $R^{27}$ are each independently a (C1-C20) alkyl group, m and q are integers of 5 to 20; $R^{28}$ and $R^{29}$ are each independently a (C1-C20)alkyl group; E is a hydrogen atom or a halogen atom; r is an integer of 1 to 3; and $R^{30}$ is a (C1-C20)alkyl group or a (C6-C30)aryl group.

Preferably, the solution polymerization according to an exemplary embodiment of the present invention may be carried out at an ethylene monomer pressure of 6 to 150 atm and a polymerization temperature of 100 to 200° C.

Preferably, the olefin polymer according to an exemplary embodiment of the present invention may have a weight average molecular weight of 5,000 to 200,000 g/mol, a molecular weight distribution (Mw/Mn) of 1.0 to 10.0, and an ethylene content of 30 to 99% by weight.

Advantageous Effects

The transition metal compound according to the present invention has significantly improved solubility in a non-aromatic hydrocarbon solvent by introducing a controlled specific functional group, such that catalytic activity is high and is maintained without deterioration during solution polymerization.

In addition, the transition metal compound according to the present invention is easily injected and transferred during a solution process by introducing a specific functional group at a specific position, such that a polymerization process is significantly improved, which is very advantageous for commercialization.

Further, the transition metal compound according to the present invention has excellent solubility in a non-aromatic hydrocarbon solvent, and has excellent reactivity with olefins, such that polymerization of olefins is very easy and a yield of the olefin polymer is high.

Thus, the catalyst composition containing the transition metal compound according to an exemplary embodiment of the present invention may be very usefully used in the preparation of the olefin polymer having excellent physical properties.

Furthermore, the method for preparing the olefin polymer according to the present invention uses the transition metal compound according to the present invention having excellent solubility in a non-aromatic hydrocarbon solvent as a catalyst, such that the catalyst may be easily transferred and injected, and the olefin polymer may be prepared in more environmentally-friendly and efficiently.

MODE FOR INVENTION

Hereinafter, the present invention will describe a transition metal compound according to the present invention, a catalyst composition containing the same, and a method for preparing an olefin polymer using the same, but technical terms and scientific terms used herein have the general meaning understood by those skilled in the art to which the present invention pertains unless otherwise defined, and a description for the known function and configuration obscuring the present invention will be omitted in the following description.

The term "alkyl" used herein refers to a saturated, linear or branched non-cyclic hydrocarbon having 1 to 20 carbon atoms, unless specifically limited to carbon atoms. A "lower alkyl" refers to linear or branched alkyl having 1 to 6 carbon atoms. A representative saturated linear alkyl includes methyl, ethyl, n-propyl, n-butyl, n-pentyl, n-hexyl, n-heptyl, n-octyl, n-nonyl, and n-decyl, while saturated branched alkyl includes isopropyl, sec-butyl, isobutyl, tert-butyl, isopentyl, 2-methylhexyl, 3-methylbutyl, 2-methylpentyl, 3-methylpentyl, 4-methylpentyl, 2-methylhexyl, 3-methylhexyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,3-dimethylhexyl, 2,4-dimethylhexyl, 2,5-dimethylhexyl, 2,2-dimethylpentyl, 2,2-dimethylhexyl, 3,3-dimethylpentyl, 3,3-dimethylhexyl, 4,4-dimethylhexyl, 2-ethylpentyl, 3-ethylpentyl, 2-decylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-diethylhexyl, 2,2-diethylhexyl, and 3,3-diethylhexyl.

In the present specification, "C1-C20" means that the number of the carbon atoms is 1 to 20. For example, (C1-C20)alkyl refers to alkyl having 1 to 20 carbon atoms.

In addition, the term "substituted aryl having 14 or more carbon atoms" used herein means that the sum of the carbon atoms of aryl and the carbon atoms of the substituent substituted on the aryl is 14 or more. Preferably, in the present specification, Ar is substituted aryl, and the substituted aryl of Ar may be aryl having one or more substituents selected from the group consisting of (C1-C20)alkyl, (C1-C20)alkoxy, (C3-C20)cycloalkyl, (C6-C30)aryl, (C6-C30)aryl(C1-C20)alkyl, (C1-C20)alkyl(C6-C30)aryl, (C1-C20)alkylsilyl, and (C6-C30)arylsilyl, wherein the sum of the carbon atoms of the substituent and the carbon atoms of the aryl is 14 or more, and more preferably, the substituted aryl of Ar may be (C6-C30)aryl having one or more substituents selected from (C8-C20)alkyl, (C6-C20)alkoxy, (C8-C20)cycloalkyl, (C—C30)aryl, (C6-C30)aryl(C1-C20)alkyl, and (C8-C20)alkyl(C6-C30)aryl which have a total carbon atom of 14 or more. For example, in (C6-C30)aryl having a substituent, the substituent is one or more selected from (C8-C20)alkyl, (C6-C20)alkoxy, (C8-C20)cycloalkyl, (C—C30)aryl, (C6-C30)aryl(C1-C20)alkyl, and (C8-C20)alkyl(C6-C30)aryl, wherein the sum of the carbon atoms of the aryl and the carbon atoms of the substituent substituted on the aryl is 14 or more.

Substituents other than substituted aryl of Ar of the present invention refer to the number of carbon atoms not including a substituent. As a specific example, in Formula 1 of the present invention, when R is (C1-C20)alkyl, it does not include the number of the carbon atoms of the substituent that may be substituted on alkyl.

The term "alkoxy" used herein refers to —O-alkyl, including —OCH$_3$, —OCH$_2$CH$_3$, —OCH$_{22}$CH$_3$, —OCH$_{23}$CH$_3$, —OCH$_{24}$CH$_3$, —OCH$_{25}$CH$_3$, and similar thereof, wherein the alkyl is as defined above.

The term "lower alkoxy" used herein refers to —O-lower alkyl, wherein the lower alkyl is as defined above.

The "aryl" used herein refers to a carbocyclic aromatic group containing 5 to 10 ring atoms. Representative examples of the aryl are phenyl, tolyl, xylyl, naphthyl, tetrahydronaphthyl, anthracenyl, fluorenyl, indenyl, azulenyl, etc, but aryl is not limited thereto. The carbocyclic aromatic group may be optionally substituted.

The term "aryloxy" used herein is RO—, and R is the aryl as defined above. The term "arylthio" is RS—, and R is the aryl as defined above.

The term "cycloalkyl" used herein refers to a monocyclic or polycyclic saturated ring having carbon and hydrogen atoms and having no carbon-carbon multiple bonds. Examples of the cycloalkyl group include, but are not limited to, (C3-C10)cycloalkyl, for example, cyclopropyl, cyclobutyl, cyclopentyl, cyclohexyl, and cycloheptyl. The cycloalkyl group may be optionally substituted. In an embodiment, the cycloalkyl group is a monocyclic or bicyclic ring.

The term "substituted" used herein means that the hydrogen atom of the moiety being substituted, for example, alkyl, aryl, heteroaryl, heterocycle, or cycloalkyl, is replaced by a substituent. In an embodiment, each carbon atom of the group being substituted is not substituted with two or more substituents. In another embodiment, each carbon atom of the group being substituted is not substituted with one or more substituents. In the case of a keto substituent, two hydrogen atoms are substituted with oxygen attached to carbon by a double bond. Unless otherwise stated with respect to the substituent, optionally substituted substituents of the present invention may be one or more selected from the group consisting of halogen, hydroxyl, lower alkyl, haloalkyl, mono- or di-alkylamino, (C1-C20)alkyl, (C1-C20)alkoxy, (C3-C20)cycloalkyl, (C6-C30)aryl, (C6-C30)aryl(C1-C20)alkyl, (C1-C20)alkyl(C6-C30)aryl, (C1-C20)alkylsilyl, (C6-C30)arylsilyl, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20)alkylphosphine, and (C6-C20)arylphosphine, and preferably, the alkyl may be (C1-C20)alkyl or (C8-C20) alkyl, and the aryl may be C6 to C12.

The term "olefin polymer" used herein refers to a polymer prepared using olefins within a range that can be recognized by those skilled in the art. Specifically, the olefin polymer includes both a homopolymer of olefin and a copolymer of olefins, and refers to a homopolymer of olefin or a copolymer of olefin and α-olefin.

The present invention provides a transition metal compound represented by the following Formula 1, which may be very usefully used in olefin polymerization because solubility is improved and thermal stability is improved by introducing a functional group having a controlled specific carbon atoms or more:

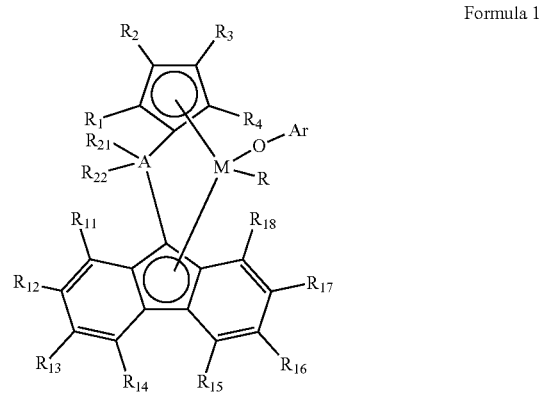

Formula 1 wherein:
M is a transition metal of Group 4 in the periodic table;
A is C or Si;
Ar is substituted aryl; and substituent of the aryl of Ar is one or more selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, and (C6-C20)arylthio and the substituted aryl of Ar have 14 or more carbon atoms;
R is (C1-C20)alkyl, (C1-C20)alkoxy, (C6-C20)aryl, or (C6-C20)aryloxy;
$R_1$ to $R_4$ are each independently hydrogen or (C1-C20) alkyl;
$R_{11}$ to $R_{18}$ are each independently hydrogen, (C1-C20) alkyl, (C1-C20)alkoxy, (C3-C20)cycloalkyl, (C6-C20) aryl, (C6-C20)aryl(C1-C20)alkyl, (C1-C20)alkyl(C6-C20)aryl, (C1-C20)alkylsilyl, or (C6-C20)arylsilyl, or each of the substituents may be linked to an adjacent substituent via (C3-C12)alkylene or (C3-C12)alkenylene with or without a fused ring to form an alicyclic ring, or a monocyclic or polycyclic aromatic ring;

$R_{21}$ and $R_{22}$ are each independently (C6-C20)aryl; and the alkyl, alkoxy, aryl and aryloxy of R, the alkyl, alkoxy, cycloalkyl, aryl, arylalkyl, alkylaryl, alkylsilyl, arylsilyl, alicyclic ring or aromatic ring of $R_{11}$ to $R_{18}$, and the aryl of $R_{21}$ and $R_{22}$ may be further substituted with one or more substituents selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20) alkylphosphine, and (C6-C20)arylphosphine.

The transition metal compound according to an exemplary embodiment of the present invention is represented by Formula 1, and may have significantly improved solubility in a non-aromatic hydrocarbon solvent and very high catalytic activity by introducing an intentionally controlled substituted aryl having 14 or more carbon atoms to Ar in Formula 1, and the olefin polymer may be prepared in a simple process environmentally-friendly.

Specifically, the transition metal compound of the present invention, which is an ANSA-type catalyst of the present invention, may increase the solubility in a non-aromatic hydrocarbon solvent and maintain catalytic activity by introducing a functional group having a controlled number of carbon atoms at a specific position, and at the same time, an olefin polymer may be easily prepared by a solution process.

Preferably, in Formula 1 according to an exemplary embodiment of the present invention, Ar may be (C6-C20) aryl substituted with an alkyl having 8 or more carbon atoms; and R may be (C1-C20)alkyl, (C1-C20)alkyl(C6-C20)aryloxy, or (C6-C20)aryl(C1-C20)alkyl.

In Formula 1 according to an exemplary embodiment of the present invention, Ar may be (C6-C20)aryl substituted with alkyl having 8 to 20 carbon atoms.

In Formula 1 according to an exemplary embodiment of the present invention, Ar may be phenyl, naphthyl, anthracenyl, pyrenyl, phenanthrenyl, tetrasenyl or tetraphenyl which is substituted with alkyl having 8 or more carbon atoms.

In Formula 1 according to an exemplary embodiment of the present invention, Ar may be (C6-C20)aryl substituted with alkyl having 8 or more carbon atoms; and R may be (C1-C20)alkyl, (C1-C20)alkyl(C6-C20)aryloxy, or (C6-C20)aryl(C1-C20)alkyl. Preferably, Ar may be (C6-C12) aryl substituted with alkyl having 8 or more carbon atoms; and R may be (C1-C10)alkyl, (C1-C10)alkyl(C6-C12)aryloxy, or (C6-C12)aryl(C1-C10)alkyl.

More preferably, in Formula 1 according to an exemplary embodiment of the present invention, M may be titanium, zirconium or hafnium; each R may be independently (C1-C7)alkyl, (C8-C20)alkyl(C6-C12)aryloxy, or (C6-C12)aryl (C1-C7)alkyl; $R_1$ to $R_4$ may be each independently hydrogen or (C1-C7)alkyl; and $R_{11}$ to $R_{18}$ may be hydrogen, and more preferably, M may be titanium; each R may be independently (C1-C4)alkyl, (C8-C15)alkyl(C6-C12)aryloxy, or (C6-C12)aryl(C1-C4)alkyl; and $R_1$ to $R_4$ may be each independently hydrogen or (C1-C4)alkyl.

Preferably, the transition metal compound represented by Formula 1 according to the present invention may be represented by the following Formula 2 or 3:

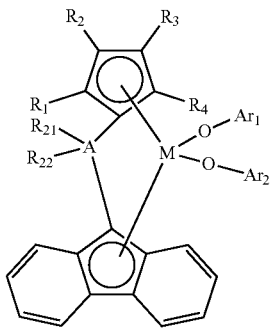

Formula 2

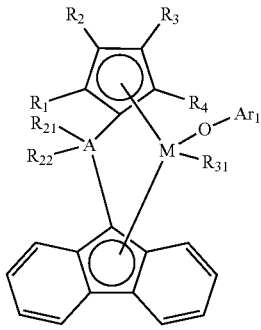

Formula 3 wherein:

M is titanium, zirconium, or hafnium;

$Ar_1$ and $Ar_2$ are each independently substituted (C6-C20) aryl; and substituent of the (C6-C20)aryl of Ar is (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, or (C6-C20)arylthio and the substituted (C6-C20)aryl have 14 or more carbon atoms;

A is C or Si;

$R_1$ to $R_4$ are each independently hydrogen or (C1-C4) alkyl;

$R_{21}$ and $R_{22}$ are each independently (C6-C20)aryl or (C6-C20)aryl substituted with (C1-C4)alkyl; and $R_{31}$ is (C1-C20)alkyl or (C1-C20)alkyl(C6-C20)aryl.

In order for the transition metal compound to have excellent solubility, in Formula 2 or 3, M may be titanium, zirconium or hafnium; $Ar_1$ and $Ar_2$ may be each independently (C6-C20)aryl substituted with alkyl having 8 or more carbon atoms; and R may be (C1-C20)alkyl, (C1-C20)alkyl (C6-C20)aryloxy, or (C6-C20)aryl(C1-C20)alkyl.

Preferably, in Formula 2 or 3, M may be titanium, zirconium or hafnium; $Ar_1$ and $Ar_2$ may be each independently (C8-C20)alkyl(C6-C20)aryl; and R may be (C1-C7) alkyl, (C8-C20)alkyl(C6-C12)aryloxy, or (C6-C12)aryl(C1-C7) alkyl, and more preferably, M may be titanium; $Ar_1$ and $Ar_2$ may be each independently (C8-C15)alkyl(C6-C12) aryl; and R may be (C1-C4)alkyl, (C8-C15)alkyl(C6-C12) aryloxy, or (C6-C12)aryl(C1-C4)alkyl.

Preferably, in Formula 2 or 3, $Ar_1$ and $Ar_2$ may be each independently (C6-C20)aryl substituted with alkyl having 8 or more carbon atoms; and R may be (C1-C20) alkyl, and more preferably, $Ar_1$ and $Ar_2$ may be each independently (C6-C20)aryl substituted with (C8-C20)alkyl; and R may be (C1-C4)alkyl.

In Formula 2 or 3 according to an exemplary embodiment of the present invention, $Ar_1$ and $Ar_2$ may be (C6-C20)aryl substituted with an alkyl having 8 or more carbon atoms and preferably phenyl, naphthyl, anthracenyl, pyrenyl, phenanthrenyl, tetrasenyl or tetraphenyl which is substituted with (C8-20)alkyl.

Preferably, in Formula 2 or 3 according to an exemplary embodiment of the present invention, the alkyl substituted with $Ar_1$ and $Ar_2$ may be linear (C1-C20)alkyl, not a branched (C1-C20)alkyl, more preferably linear (C8-C20) alkyl, and still more preferably linear (C8-C15)alkyl.

Preferably, the transition metal compound according to an exemplary embodiment of the present invention may be represented by the following Formula 4 or 5:

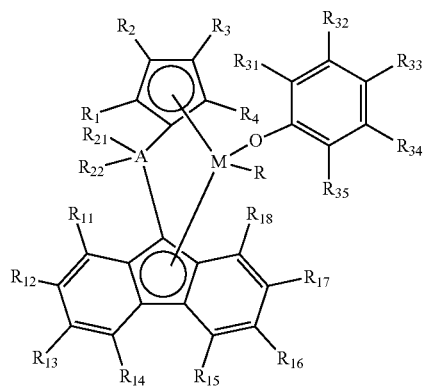

Formula 4

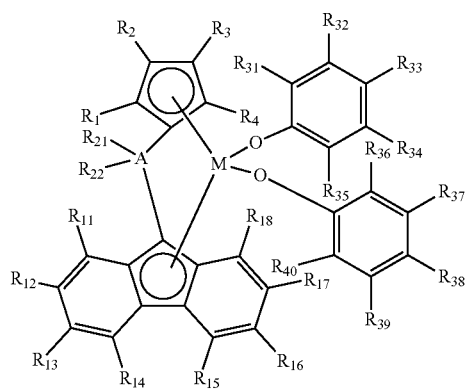

Formula 5 wherein:

M is titanium, zirconium, or hafnium;

A is C or Si;

R is (C1-C20)alkyl;

$R_1$ to $R_4$ are each independently hydrogen or (C1-C4) alkyl;

$R_{11}$ to $R_{18}$ are each independently hydrogen, (C1-C20) alkyl, (C1-C20)alkoxy, (C3-C20)cycloalkyl, (C6-C30) aryl, (C6-C30)aryl(C1-C20)alkyl, (C1-C20)alkyl(C6-C30)aryl, (C1-C20)alkylsilyl, or (C6-C30)arylsilyl, or each of the substituents may be linked to an adjacent substituent via (C3-C12)alkylene or (C3-C12)alkenylene with or without a fused ring to form an alicyclic ring, or a monocyclic or polycyclic aromatic ring;

$R_{21}$ and $R_{22}$ are each independently (C6-C20)aryl or (C6-C20)aryl substituted with (C1-C4)alkyl; and $R_{31}$ to $R_{40}$ are each independently (C1-C20)alkyl or (C6-C20)aryl.

Preferably, in Formula 4 according to an exemplary embodiment of the present invention, $R_{31}$ to $R_{40}$ may be each independently (C1-C20)alkyl, more preferably linear (C1-C20)alkyl, and still more preferably linear (C8-C20) alkyl.

The transition metal compound according to an exemplary embodiment of the present invention has high solubility in non-aromatic hydrocarbon solvents, and thus has good polymerization reactivity with other olefins while maintaining catalytic activity, may prepare a high molecular weight polymer in a high yield, and is more advantageous in a solution process, which is very easy to commercialize.

Preferably, in Formulas 4 and 5 according to an exemplary embodiment of the present invention, M may be titanium, zirconium or hafnium; A may be C; R may be each independently (C1-C4)alkyl; $R_1$ to $R_4$ may be each independently hydrogen or C1-C4 alkyl; $R_{11}$ to $R_{18}$ may be each independently hydrogen, (C1-C20)alkyl, (C1-C20)alkoxy, or (C6-C30)aryl; $R_{21}$ and $R_{22}$ may be each independently (C6-C12)aryl or (C6-C12)aryl substituted with C1-C4 alkyl; and $R_{31}$ to $R_{40}$ may be each independently (C1-C20)alkyl.

In order for the transition metal compound to have more excellent solubility, catalytic activity and reactivity with olefins, preferably, in Formulas 4 and 5 according to an exemplary embodiment of the present invention, $R_{31}$ to $R_{40}$ may be each independently (C1-C20)alkyl, and more preferably linear (C1-C20)alkyl, and specifically, $R_{31}$ to $R_{40}$ may be n-octyl, n-nonyl, n-decyl, n-undecyl, or n-dodecyl.

Specifically, the transition metal compound according to an exemplary embodiment of the present invention may be a compound selected from the following structures, but is not limited thereto:

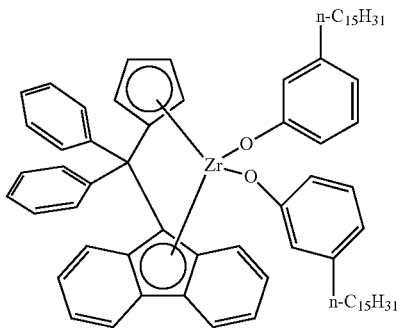

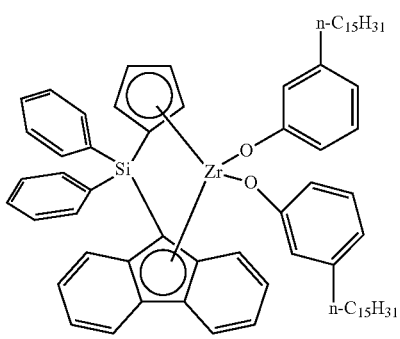

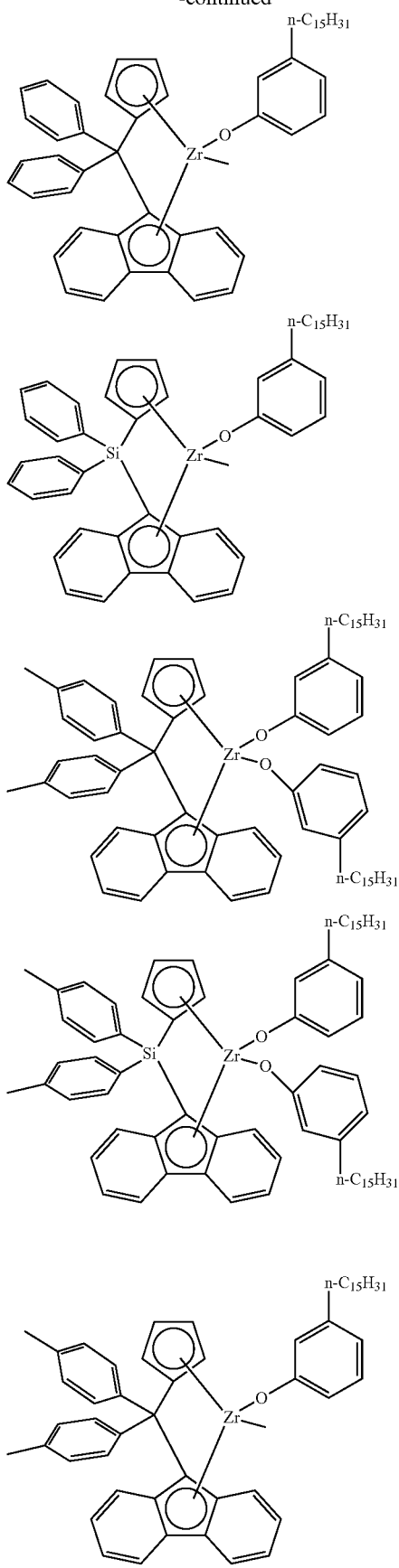
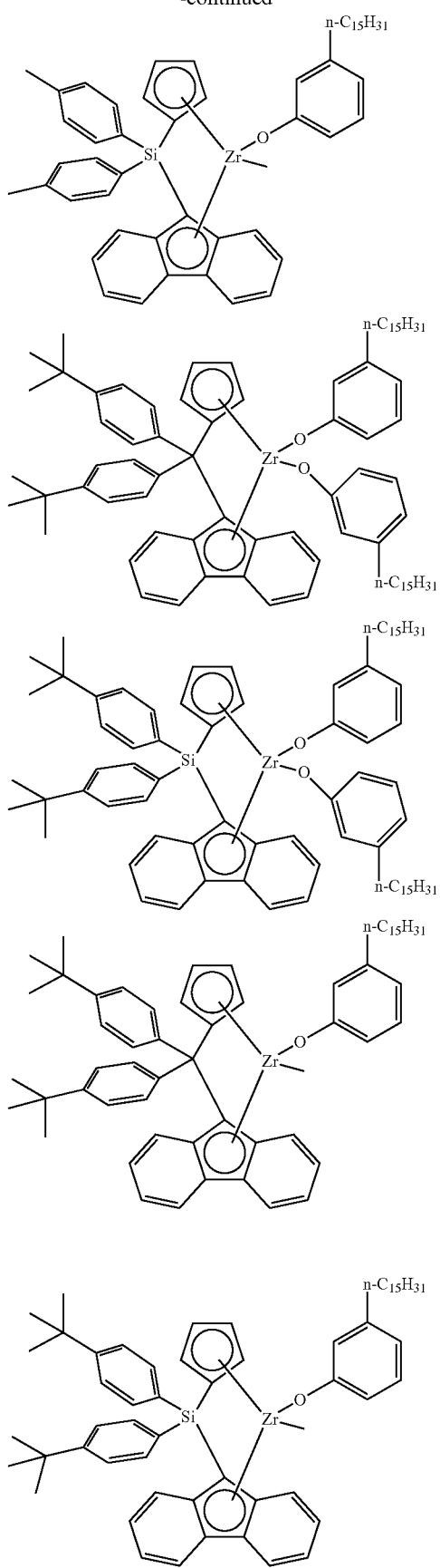

-continued
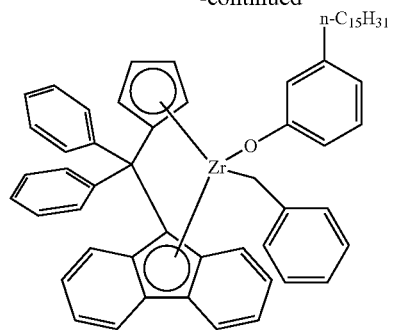
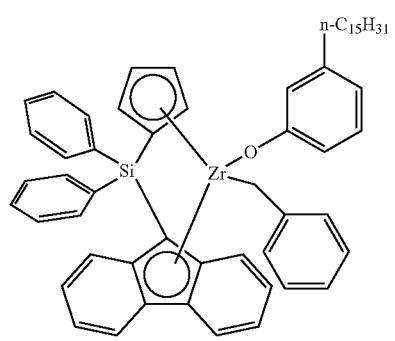
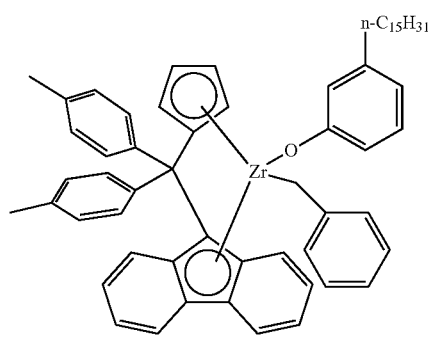
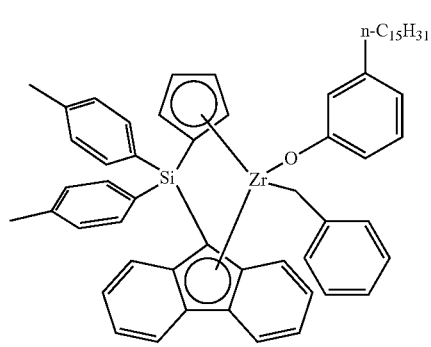
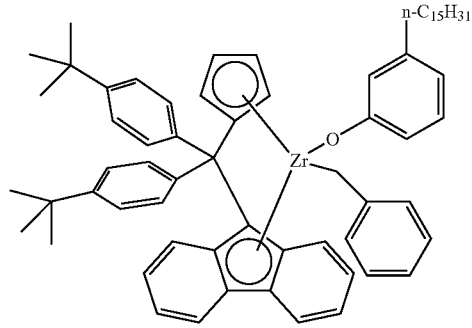
-continued
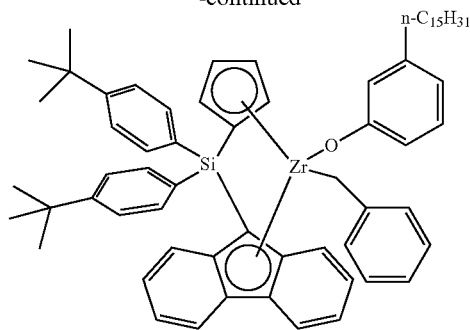
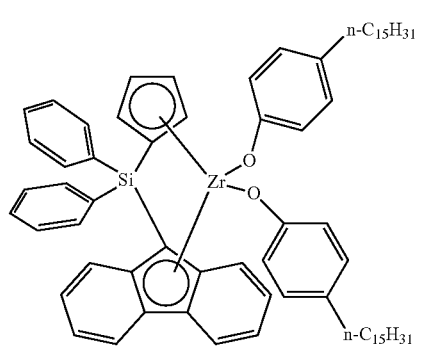
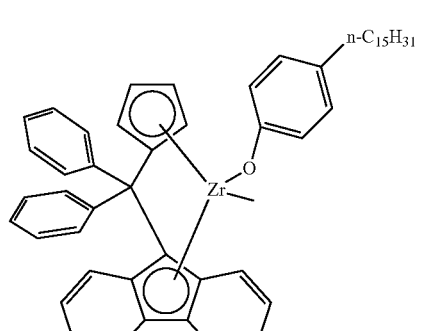
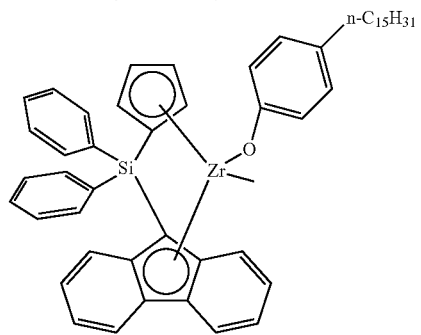
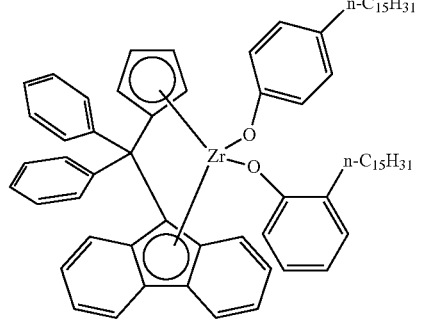

-continued

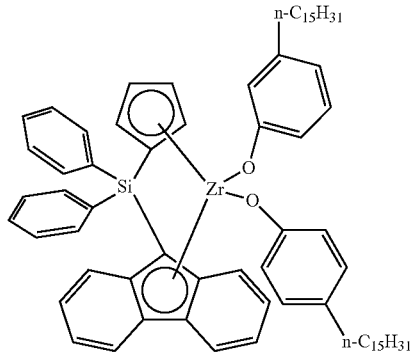

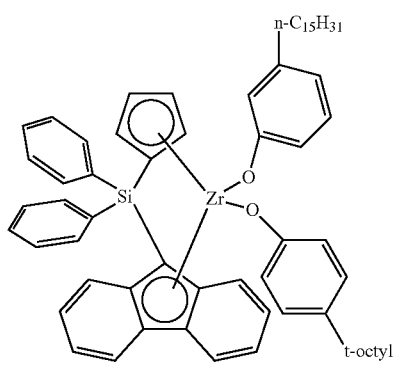

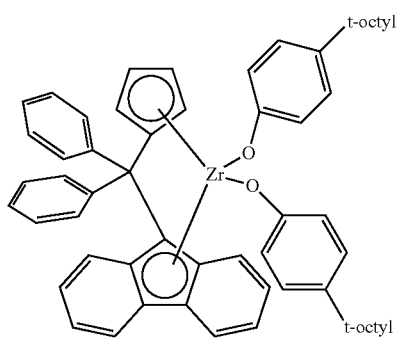

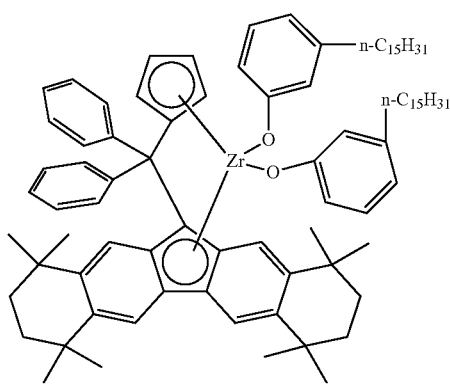

-continued

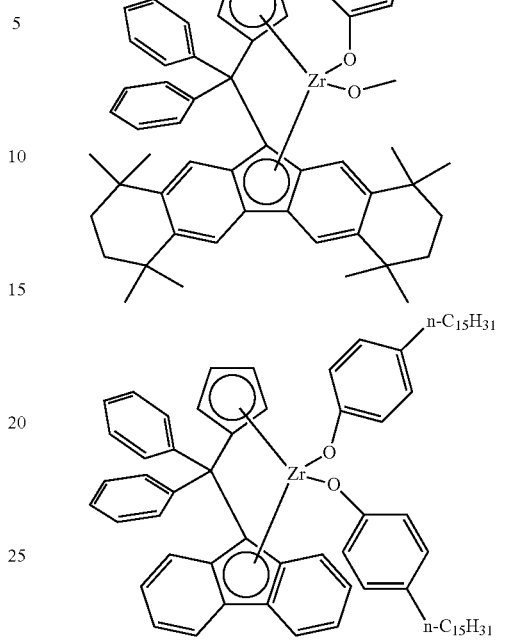

In addition, the present invention provides a transition metal catalyst composition for preparing an olefin polymer, containing a transition metal compound and a cocatalyst according to the present invention.

The cocatalyst according to an exemplary embodiment of the present invention may be a boron compound cocatalyst, an aluminum compound cocatalyst, and a mixture thereof.

In addition, the present invention provides a method for preparing an olefin polymer using the transition metal compound according to the present invention, and the method for preparing the olefin polymer according to the present invention includes:

obtaining an olefin polymer by solution polymerization of one or two or more monomers selected from ethylene and a comonomer in the presence of a transition metal compound represented by the following Formula 1, a cocatalyst, and a non-aromatic hydrocarbon solvent:

Formula 1

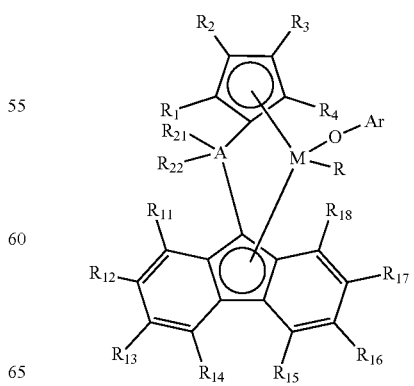

wherein:
M is a transition metal of Group 4 in the periodic table;
A is C or Si;
Ar is substituted aryl; and substituent of the aryl of Ar is one or more selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, and (C6-C20)arylthio and the substituted aryl have 14 or more carbon atoms;
R is (C1-C20)alkyl, (C1-C20)alkoxy, (C6-C20)aryl, or (C6-C20)aryloxy;
$R_1$ to $R_4$ are each independently hydrogen or (C1-C20)alkyl;
$R_{11}$ to $R_{18}$ are each independently hydrogen, (C1-C20)alkyl, (C1-C20)alkoxy, (C3-C20)cycloalkyl, (C6-C20)aryl, (C6-C20)aryl(C1-C20)alkyl, (C1-C20)alkyl(C6-C20)aryl, (C1-C20)alkylsilyl, or (C6-C20)arylsilyl, or each of the substituents may be linked to an adjacent substituent via (C3-C12)alkylene or (C3-C12)alkenylene with or without a fused ring to form an alicyclic ring, or a monocyclic or polycyclic aromatic ring;
$R_{21}$ and $R_{22}$ are each independently (C6-C20)aryl; and the alkyl, alkoxy, aryl or aryloxy of R, the alkyl, alkoxy, cycloalkyl, aryl, arylalkyl, alkylaryl, alkylsilyl, arylsilyl, alicyclic ring or aromatic ring of $R_1$ to $R_{18}$, and the aryl of $R_{21}$ and $R_{22}$ may be further substituted with one or more substituents selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20)alkylphosphine, and (C6-C20)arylphosphine.

Preferably, the method for preparing an olefin polymer according to an exemplary embodiment of the present invention may easily prepare an olefin polymer while maintaining high activity by using a transition metal compound having a high solubility in a non-aromatic hydrocarbon solvent, as a catalyst.

The transition metal compound according to an exemplary embodiment of the present invention may have a solubility of 1% by weight or more (solvent: methylcyclohexane) at 25° C., and preferably 1.2 to 40% by weight (solvent: methylcyclohexane) at 25° C.

Preferably, the non-aromatic hydrocarbon solvent according to an exemplary embodiment of the present invention is not limited, but may be one or two or more selected from the group consisting of methylcyclohexane, cyclohexane, n-heptane, n-hexane, and n-pentane, and preferably one or a mixed solvent of two or more selected from the group consisting of methylcyclohexane, cyclohexane, n-heptane, and n-hexane.

Preferably, the non-aromatic hydrocarbon solvent according to an exemplary embodiment of the present invention may have a solubility of 1% by weight or more (solvent: methylcyclohexane) at 25° C., and more preferably 1.2 to 40% by weight (solvent: methylcyclohexane) at 25° C.

The cocatalyst according to an exemplary embodiment of the present invention may be an aluminum compound cocatalyst, a boron compound cocatalyst, or a mixture thereof, and may be contained in a molar ratio of 0.5 to 10,000 per 1 mol of the transition metal compound.

Examples of boron compound that may be used as a cocatalyst in the present invention include a boron compound known in U.S. Pat. No. 5,198,401, and may be specifically selected from compounds represented by Formulas 11 to 14 below:

$$BR^{21}_3 \quad \text{Formula 11}$$

$$[R^{22}]^+[BR^{21}_4]^- \quad \text{Formula 12}$$

$$[R^{23}_pZH]^+[BR^{21}_4]^- \quad \text{Formula 13}$$

Formula 14

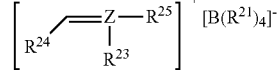

wherein B is a boron atom; $R^{21}$ is a phenyl group, and the phenyl group may be further substituted with 3 to 5 substituents selected from the group consisting of a fluorine atom, a (C1-C20)alkyl group, a (C1-C20)alkyl group substituted with a fluorine atom, a (C1-C20)alkoxy group, or a (C1-C20)alkoxy group substituted with a fluorine atom; $R^{22}$ is a (C5-C7) aromatic radical, a (C1-C20)alkyl(C6-C20)aryl radical or a (C6-C20)aryl(C1-C20)alkyl radical; Z is nitrogen or phosphorus atom; $R^{23}$ is a (C1-C20)alkyl radical or an anilinium radical substituted with two (C1-C10)alkyl groups together with a nitrogen atom; $R^{24}$ is a (C5-C20)alkyl group; $R^{21}$ is a (C5-C20)aryl group or a (C1-C20)alkyl(C6-C20)aryl group; and p is an integer of 2 or 3.

Preferred examples of the boron-based cocatalyst include trityl terakis(pentafluorophenyl)borate, tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenyl bis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenyl bis(pentafluorophenyl)borate, or tetrakis(3,5-bistrifluoromethylphenyl)borate. In addition, examples of specific combinations of the boron-based cocatalyst include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, triethylammonium tetrakis(pentafluorophenyl)borate, tripropylammonium tetrakis(pentafluorophenyl)borate, trinormal butylammonium tetrakis(pentafluorophenyl)borate, trinormal butylammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, trimethylphenylphosphonium tetrakis(pentafluorophenyl)borate, or tridimethylphenylphosphonium tetrakis(pentafluorophenyl)borate, the most preferred of which may be any one or two or more selected from the group consisting of trityl terakis(pentafluorophenyl)borate, N,N-dimethylanilinium tetrakis(pentafluorophenyl)borate, triphenylmethyllinium tetrakis(pentafluorophenyl)borate, and tris(pentafluoro)borane.

Examples of an aluminum compound cocatalyst that may be used as a cocatalyst in the catalyst composition according to an exemplary embodiment of the present invention may include an aluminoxane compound of Formula 15 or 16, an organoaluminum compound of Formula 17, or an organoaluminum alkyl oxide or organoaluminum aryl oxide compound of Formula 18 or Formula 19:

$$\text{—AlR}^{26}\text{—O—}_m \quad \text{Formula 15}$$

$$R^{27}{}_2Al\text{—}(OR^{27})_q\text{—O—}AlR^{27}{}_2 \quad \text{Formula 16}$$

$$R^{28}{}_r AlE_{3-r} \quad \text{Formula 17}$$

$$R^{29}{}_2AlOR^{30} \quad \text{Formula 18}$$

$$R^{29}AlOR^{30}{}_2 \quad \text{Formula 19}$$

wherein $R^{26}$ and $R^{27}$ are each independently a (C1-C20) alkyl group; m and q are integers of 5 to 20; $R^{28}$ and $R^{29}$ are each independently a (C1-C20)alkyl group; E is a hydrogen atom or a halogen atom; r is an integer of 1 to 3; and $R^{30}$ is a (C1-C20)alkyl group or a (C6-C30)aryl group.

Specific examples which may be used as the aluminum compound include methylaluminoxane, modified methylaluminoxane, or tetraisobutylaluminoxane as examples of an aluminoxane compound; trialkylaluminum including trimethylaluminum, triethylaluminum, tripropylaluminum, triisobutylaluminum and trihexylaluminum; dialkylaluminumchloride including dimethylaluminumchloride, diethylaluminumchloride, dipropylaluminum chloride, diisobutylaluminumchloride and dihexylaluminumchloride; alkylaluminumdichloride including methylaluminumdichloride, ethylaluminumdichloride, propylaluminumdichloride, isobutylaluminumdichloride and hexylaluminumdichloride; dialkylaluminum hydride including dimethylaluminum hydride, diethylaluminum hydride, dipropylaluminum hydride, diisobutylaluminum hydride and dihexylaluminum hydride; and alkyl alkoxy aluminum including methyldimethoxyaluminum, dimethylmethoxyaluminum, ethyldiethoxyaluminum, diethylethoxyaluminum, isobutyldibutoxyaluminum, diisobutylbutoxyaluminum, hexyldimethoxyaluminum, dihexylmethoxyaluminum, and dioctylmethoxyaluminum as examples of an organic aluminum compound, preferably one or a mixture thereof selected from the group consisting of methylaluminoxane, modified methylaluminoxane, tetraisobutylaluminoxane, trialkylaluminum, triethylaluminum and triisobutylaluminum, more preferably trialkylaluminum, and still more preferably triethylaluminum and triisobutylaluminum.

Preferably, in the catalyst composition according to an exemplary embodiment of the present invention, the aluminum compound cocatalyst has a molar ratio of metal (M): aluminum atom (Al) of 1:50 to 1:5,000, and a ratio between the transition metal compound of Formula 1 and the cocatalyst has a preferable range of a molar ratio of metal (M): boron atom:aluminum atom of 1:0.1 to 100:10 to 1,000, and more preferably 1:0.5 to 5:25 to 500.

As another aspect according to an exemplary embodiment of the present invention, the method for preparing an olefin polymer using the transition metal compound may be carried out by contacting the transition metal compound, a cocatalyst, and ethylene or, if necessary, a vinyl-based comonomer in the presence of a non-aromatic hydrocarbon solvent. In this case, the transition metal compound and the cocatalyst component may be separately injected into a reactor, or may be injected into the reactor by mixing each component in advance, and there is no limitation on the mixing conditions such as the order of injection, temperature, or concentration.

Preferred organic solvents which may be used in the above preparation method may be non-aromatic hydrocarbon solvents, and preferably non-aromatic (C3-C20) hydrocarbons, and specific examples of which are butane, isobutane, pentane, hexane, heptane, octane, isooctane, nonane, decane, dodecane, cyclohexane, methylcyclohexane, etc.

Specifically, in the case of preparing a copolymer of ethylene and α-olefin, (C3-C18) α-olefin may be used as a comonomer together with ethylene, and may be preferably selected from the group consisting of propylene, 1-butene, 1-pentene, 4-methyl-1-pentene, 1-hexene, 1-octene, 1-heptene, 1-decene, 1-undecene, 1-dodecene, 1-tetradecene, 1-hexadecene, 1-itocene, and 1-octadecene. More preferably, 1-butene, 1-hexene, 1-octene, or 1-decene may be copolymerized with ethylene. In this case, for a preferred ethylene pressure and polymerization reaction temperature, the pressure may be 1 to 1000 atm, and more preferably 10 to 150 atm. In addition, it is effective that the polymerization reaction is carried out at a temperature between 100° C. and 200° C., and preferably 100° C. to 150° C.

In addition, the copolymer prepared according to the method of the present invention may have an ethylene content of 30 to 99% by weight, preferably contains 50% by weight or more of ethylene, more preferably contains 60% by weight or more of ethylene, and still more preferably 60 to 99% by weight of ethylene.

The content of ethylene contained in the olefin polymer of the present invention was confirmed by a method of converting the content of comonomer from the value measured using $^{13}$C-nuclear magnetic resonance (NMR) spectroscopy.

As described above, a linear low-density polyethylene (LLDPE) having a density region of 0.940 g/cc or less is prepared by using (C4-C10) α-olefin as a comonomer, which may be extended to a region of a very low density polyethylene (VLDPE) or an ultra low density polyethylene (ULDPE) or olefin elastomer having a density of 0.900 g/cc or less. Further, in order to adjust a molecular weight in the preparation of the ethylene copolymer according to the present invention, hydrogen may be used as a molecular weight regulator, and the ethylene copolymer usually has a weight average molecular weight (Mw) in a range of 80,000 to 500,000 g/mol.

As specific examples of the olefin-diene copolymer prepared by the catalyst composition according to an exemplary embodiment of the present invention, an ethylene-propylene-diene copolymer having an ethylene content of 30 to 80% by weight, a propylene content of 20 to 70% by weight, and a diene content of 0 to 15% by weight may be prepared. A diene monomer that may be used in the present invention has two or more double bonds, and examples of which include 1,4-pentadiene, 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 2-methyl-1,3-butadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, cyclopentene, cyclohexene, cyclopentadiene, cyclohexadiene, norbornene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-phenyl-2,5-norbornadiene, 7-hexyl-2,5-norbornadiene, 7,7-dimethyl-2,5-norbornadiene, 7-methyl-7-ethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, 5-isopropyl-2-norbornene, 1,4-cyclohexadiene, bicyclo[2,2,1]hepta-2,5-diene, 5-ethylidene-2-norbornene, 5-methylene-2-norbornene, bicyclo[2,2,2]octa-2,5-diene, 4-vinylcyclohexa-1-ene, bicyclo[2,2,2]octa-2,6-diene, 1,7,7-trimethylbicyclo[2,2,1]hepta-2,5-diene, dicyclopentadiene, phethyltetrahydroindene, 5-arylbicyclo[2,2,1]hepta-2-ene, 1,5-cyclooctadiene, 1,4-diarylbenzene, butadiene, isoprene, 2,3-dimethylbutadiene-1,3, 1,2-butadiene-1,3, 4-methylpentadiene-1,3, 1,3-pentadiene, 3-methyl-1,3-pentadiene, 2,4-dimethyl-1,3-pentadiene, 3-ethyl-1,3-pentadiene, etc., and most preferably 5-ethylidene-2-norbornene and dicyclopentadiene. The diene monomer may be selected according to the processing characteristics of the ethylene-propylene-diene copolymer, and may be used by mixing two or more diene monomers, if necessary.

In this case, for a preferred pressure of the reactor and temperature, the pressure is 1 to 1000 atm, preferably 6 to 150 atm, and more preferably 5 to 100 atm. In addition, it is effective that the polymerization reaction is carried out at a temperature between 100 and 200° C., and preferably 100 to 150° C.

In the ethylene-olefin-diene copolymer prepared according to an exemplary embodiment of the present invention, the ethylene content may be 30 to 80% by weight, the olefin content may be 20 to 70% by weight, and the diene content may be 0 to 15% by weight.

In general, when the ethylene-propylene-diene copolymer is prepared, increasing the propylene content results in a decrease in the molecular weight of the copolymer. However, when the ethylene-propylene-diene copolymer according to the present invention is prepared, even if the content of propylene increased by 50%, it was possible to prepare a product having a relatively high molecular weight without decreasing molecular weight.

Since the catalyst composition presented in the present invention is present in a homogeneous form in a polymerization reactor, it is preferred to apply to a solution polymerization process which is carried out at a temperature equal to or more than a melting point of the polymer. However, as disclosed in U.S. Pat. No. 4,752,597, the catalyst composition may also be used in a slurry polymerization or gas phase polymerization process in the form of a heterogeneous catalyst composition obtained by supporting the transition metal compound and the cocatalyst on a porous metal oxide support.

Hereinafter, the present invention will be described in detail by the following examples, however, the scope of the present invention is not limited thereto.

Unless otherwise stated, all experiments of synthesizing the transition metal compound were carried out using a standard Schlenk or glove box technology under a nitrogen atmosphere, and an organic solvent used in the reaction was refluxed under a sodium metal and benzophenone to remove moisture, and used after being distilled immediately before use. The $^1$H NMR analysis of the synthesized transition metal compound was carried out using a Bruker 400 or 500 MHz at room temperature.

Normal heptane, which is a polymerization solvent, was used after being passed through a tube filled with a 5 Å molecular sieve and activated alumina and bubbling with high-purity nitrogen to sufficiently remove moisture, oxygen and other catalyst poison substances. The polymerized polymer was analyzed by the method described below:

1. Melt Flow Index (MI)
The melt flow index was measured under a load of 2.16 kg at 190° C. using an ASTM D1238 analysis method.
2. Density
The density was measured by an ASTM D792 analysis method.
3. Molecular Weight and Molecular Weight Distribution
The molecular weight was measured by gel chromatography using a 3-stages mixed column.

In this case, the solvent used was 1,2,4-trichlorobenzene, and the measurement temperature was 120° C.

Example 1: Synthesis of Transition Metal Compound 1

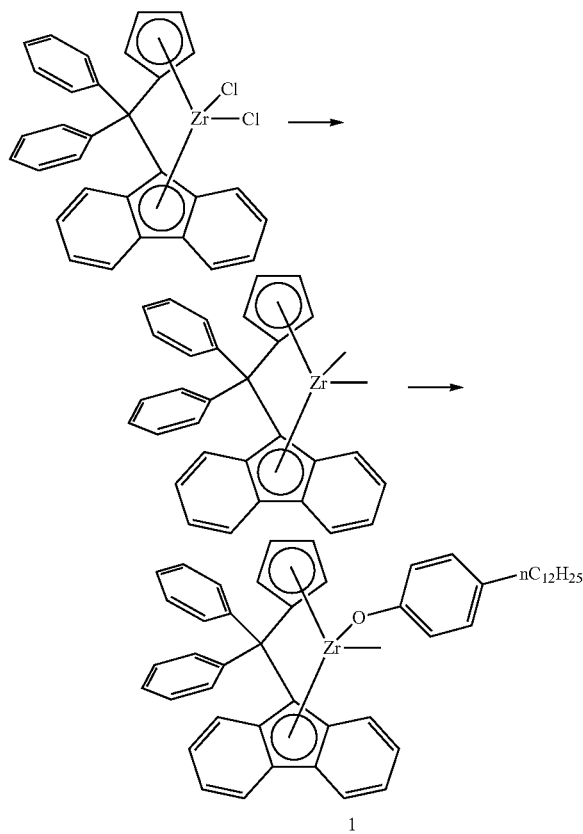

1

In a 250 mL round flask under a nitrogen atmosphere, 9-fluorenyl1-diphenylmethylcyclopentadienylzirconium dichloride (manufactured by S-PCI, 10.0 g, 18.0 mmol) was dissolved in 100 mL of toluene. After lowering the temperature to −15° C., 1.5M methyllithium (24.0 mL, 35.9 mmol) was slowly injected therein, and the temperature was raised to room temperature, followed by stirring for 3 hours. The reaction mixture was stirred vigorously while 4-dodecylphenol (4.72 g, 18.0 mmol) was added and stirred at 60° C. for 3 hours, and then the solvent was removed under vacuum. The concentrate was dissolved in 200 mL of normal hexane, and then filtered through a filter filled with dried celite to remove solids. All solvents in the filtrate were removed to obtain a yellow transition metal compound 1 (13.2 g, yield: 91.7%).

¹H NMR (CDCl₃, 500 MHz): δ=8.17 (d, 1H), 8.10 (d, 1H), 7.98 (d, 1H), 7.87 (d, 2H), 7.78 (d, 1H), 7.40 (m, 2H), 7.31 (m, 2H), 7.25 (m, 3H), 7.08 (m, 2H), 6.92 (t, 1H), 6.80 (t, 1H), 6.67 (d, 1H), 6.43 (d, 1H), 6.30 (d, 1H), 6.24 (d, 1H), 6.08 (d, 1H), 5.79 (m, 2H), 5.61 (dd, 2H), 2.64 (t, 2H), 1.62 (m, 2H), 1.31 (m, 18H), 0.87 (m, 3H), −1.36 (s, 3H).

Example 2: Preparation of Transition Metal Compound 2

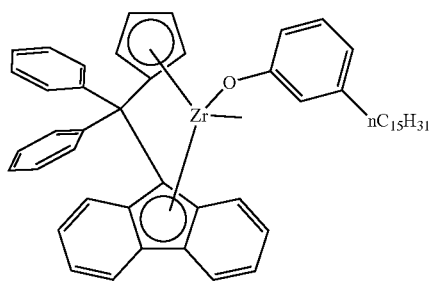

2

The transition metal compound 2 (18.7 g, yield: 95.4%) was prepared in the same manner as that in Example 1, except that 4-pentadecanylphenol was used instead of 4-dodecylphenol in Example 1.

¹H NMR (CDCl₃, 500 MHz): δ=8.16 (d, 1H), 8.10 (d, 1H), 7.95 (d, 1H), 7.88 (d, 2H), 7.78 (d, 1H), 7.39 (m, 2H), 7.30 (m, 2H), 7.25 (m, 3H), 7.08 (m, 2H), 6.92 (t, 1H), 6.78 (t, 1H), 6.65 (d, 1H), 6.41 (d, 1H), 6.29 (d, 1H), 6.24 (d, 1H), 6.05 (d, 1H), 5.79 (m, 2H), 5.60 (dd, 2H), 2.65 (t, 2H), 1.63 (m, 2H), 1.30 (m, 24H), 0.88 (m, 3H), −1.35 (s, 3H).

Example 3: Preparation of Transition Metal Compound 3

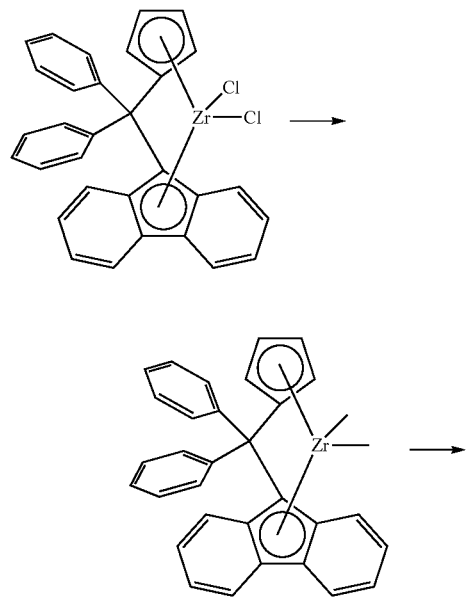

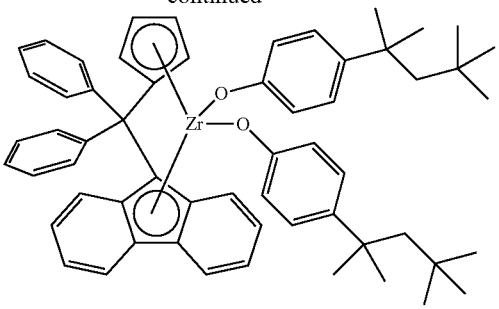

3

In a 250 mL round flask under a nitrogen atmosphere, 9-fluorenyl1-diphenylmethylcyclopentadienylzirconium dichloride (manufactured by S-PCI, 10.0 g, 18.0 mmol) was dissolved in 100 mL of toluene. After lowering the temperature to −15° C., 1.5M methyllithium (24.0 mL, 35.9 mmol) was slowly added therein, and the temperature was raised to room temperature, followed by stirring for 3 hours. 4-(2,4,4,-trimethylpentan-2-yl)phenol (7.41 g, 35.9 mmol) was added therein under strong stirring and stirred at 60° C. for 3 hours, and the solvent was removed under reduced pressure. The resulting mixture was dissolved in 200 mL of normal hexane, and then filtered through a filter filled with dried celite to remove solids. All solvents in the filtrate were removed to obtain a yellow transition metal compound 3 (15.5 g, 96.3% yield).

¹H NMR (CDCl₃, 500 MHz): δ=8.24 (d, 2H), 7.95 (dd, 4H), 7.45 (t, 2H), 7.35 (m, 4H), 7.21 (m, 2H), 7.05 (t, 2H), 6.87 (t, 2H), 6.71 (d, 2H), 6.48 (d, 2H), 6.05 (m, 2H), 5.98 (m, 4H), 5.85 (m, 2H), 1.36 (s, 4H), 0.92 (s, 30H).

Example 4: Preparation of Transition Metal Compound 4

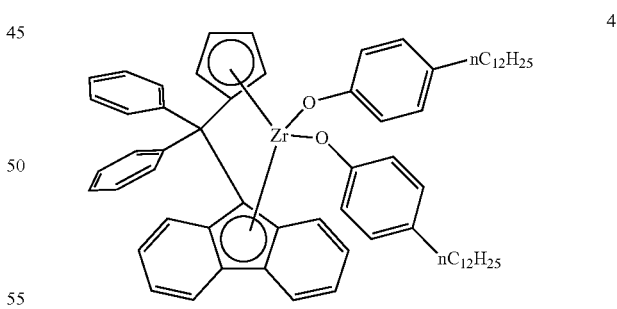

4

The transition metal compound 4 (17.3 g, yield: 95.5%) was prepared in the same manner as that in Example 3, except that 4-dodecylphenol was used instead of 4-(2,4,4,-trimethylpentan-2-yl)phenol in Example 3.

¹H NMR (CDCl₃, 500 MHz): δ=8.25 (d, 2H), 7.94 (dd, 4H), 7.45 (t, 2H), 7.35 (m, 4H), 7.20 (m, 2H), 7.08 (t, 2H), 6.88 (t, 2H), 6.70 (d, 2H), 6.47 (d, 2H), 6.03 (m, 2H), 5.98 (m, 4H), 5.85 (m, 2H), 2.64 (t, 4H), 1.62 (m, 4H), 1.31 (m, 36H), 0.87 (m, 6H).

Example 5: Preparation of Transition Metal Compound 5

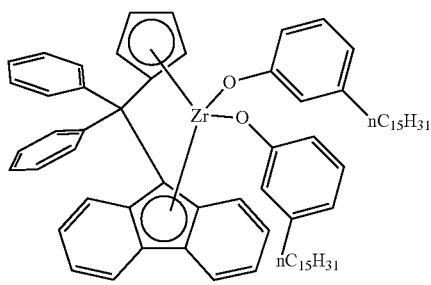

The transition metal compound 5 (19.1 g, yield: 97.4%) was prepared in the same manner as that in Example 3, except that 3-pentadecanylphenol was used instead of 4-(2,4,4,-trimethylpentan-2-yl)phenol in Example 3.

$^1$H NMR (CDCl$_3$, 500 MHz): δ=8.24 (d, 2H), 7.94 (dd, 4H), 7.45 (t, 2H), 7.35 (m, 4H), 7.22 (m, 2H), 7.09 (t, 2H), 6.88 (t, 2H), 6.71 (d, 2H), 6.47 (d, 2H), 6.03 (m, 2H), 5.99 (m, 4H), 5.85 (m, 2H), 2.63 (t, 4H), 1.63 (m, 4H), 1.30 (m, 48H), 0.89 (m, 6H).

Comparative Example 1: Compound of Comparative Example 1

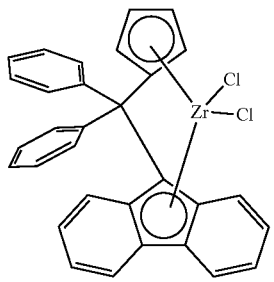

The compound of Comparative Example 1 was purchased and used from S-PCI.

Comparative Example 2: Preparation of Compound of Comparative Example 2

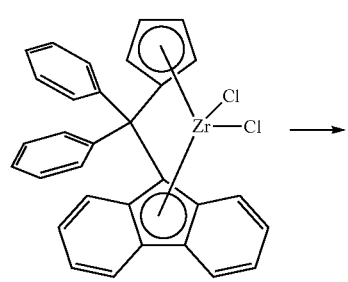

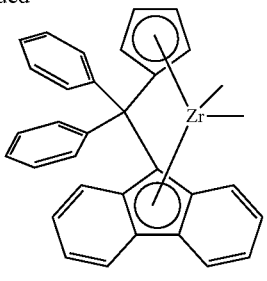

Comparative Example 2

In a 250 mL round flask under a nitrogen atmosphere, 9-fluorenyl1-diphenylmethylcyclopentadienylzirconium dichloride (manufactured by S-PCI, 10.0 g, 18.0 mmol) was dissolved in 100 mL of toluene. After lowering the temperature to −15° C., 1.5M methyllithium (24.0 mL, 35.9 mmol) was slowly added therein, and the temperature was raised to room temperature, stirred for 3 hours, and filtered through a filter filled with dried celite to remove solids. After filtration, all solvents in the filtrate were removed to obtain a yellow compound of Comparative Example 2 (8.5 g, yield: 91.4%).

$^1$H NMR (CDCl$_3$, 500 MHz): δ=8.20 (d, 2H), 7.85 (dd, 4H), 7.41 (m, 4H), 7.28 (m, 4H), 6.89 (m, 2H), 6.28 (m, 4H), 5.54 (m, 2H), −1.69 (s, 6H).

Comparative Example 3: Preparation of Compound of Comparative Example 3

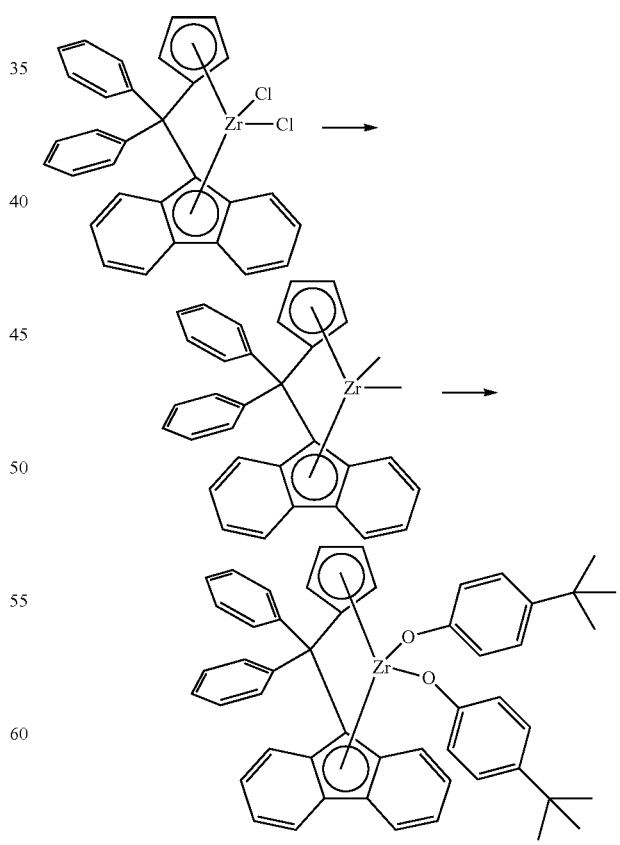

Comparative Example 3

The compound of Comparative Example 3 (12.8 g, yield: 91.4%) was prepared in the same manner as that in Example 3, except that 4-tert-butylphenol was used instead of 4-(2,4,4,-trimethylpentan-2-yl)phenol in Example 3.

$^1$H NMR (CDCl$_3$, 500 MHz): δ=8.24 (d, 2H), 7.94 (dd, 4H), 7.45 (t, 2H), 7.35 (m, 4H), 7.22 (m, 2H), 7.09 (t, 2H), 6.88 (t, 2H), 6.70 (d, 2H), 6.47 (d, 2H), 6.03 (m, 2H), 5.99 (m, 4H), 5.85 (m, 2H), 1.30 (t, 18H).

Measurement of Solubility of Prepared Transition Metal Compound 1 g of the transition metal compound was dissolved in 4 g of each of the solvents described in the following table at 25° C. under a nitrogen atmosphere to prepare a saturated solution, and then solids were removed with a 0.45 μm filter. The weight of the remaining catalyst was measured by removing all of the solvents, and the solubility of the catalyst was calculated therefrom, and is shown in Table 1 below.

TABLE 1

| Transition metal compound | Solubility (wt %: toluene) | Solubility (wt %: methyl-cyclohexane (MCH)) | Solubility (wt %: n-hexane) |
| --- | --- | --- | --- |
| Example 1 | >20 | 13.2 | 4.3 |
| Example 2 | >20 | 15.1 | 6.8 |
| Example 4 | >20 | 17.3 | 7.5 |
| Example 5 | >20 | 23.2 | 11.5 |
| Comp. Example 1 | 0.3 | Insoluble | Insoluble |
| Comp. Example 2 | 1.1 | Insoluble | Insoluble |
| Comp. Example 3 | 5.3 | 0.04 | Insoluble |

As suggested in Table 1, it can be seen that the transition metal compounds prepared in Examples 1, 2, 4, and 5 of the present invention exhibit surprisingly excellent solubility in non-aromatic hydrocarbon solvents.

Examples 6 to 8 and Comparative Examples 4 and 5: Copolymerization of Ethylene and 1-Octene Using a Batch Polymerization Apparatus Copolymerization of ethylene and 1-octene was carried out using a batch polymerization apparatus as follows:

After sufficiently drying, 600 mL of heptane and 60 mL of 1-octene were added to a 1,500 mL stainless steel reactor substituted with nitrogen, and then 2 mL of triisobutylaluminum (1.0 M hexane solution) was added to the reactor. Thereafter, after heating the reactor, 1.0% by weight of the transition metal compounds prepared in Examples 2, 3, 5 and Comparative Examples 1 and 2, 0.7 mL of a toluene solution, and 1.8 g of modified methylaluminoxane (20% by weight, a heptane solution manufactured by Nouryon) were sequentially added therein, ethylene was charged so that the pressure in the reactor was 10 kg/cm$^2$, and then the ethylene was continuously supplied to allow polymerization. After the reaction was allowed to proceed for 5 minutes, the recovered reaction product was dried in a vacuum oven at 40° C. for 8 hours. The reaction temperature, ΔT, catalytic activity, density, and molecular weight are shown in Table 2 below.

TABLE 2

| | Transition metal compound | Amount of catalyst used (mol) | Reaction temperature (° C.) | ΔT (° C.) | Catalyst activity (kg of polymer weight/mmol of amount of catalyst used) |
| --- | --- | --- | --- | --- | --- |
| Example 6 | Example 2 | 7 | 100 | 119.3 | 7.6 |
| Example 7 | Example 3 | 7 | 100 | 117.3 | 6.8 |
| Example 8 | Example 5 | 7 | 100 | 118.3 | 7.2 |
| Comp. Example 4 | Comp. Example 1 | 7 | 100 | 115.8 | 6.3 |
| Comp. Example 5 | Comp. Example 2 | 7 | 100 | 115.3 | 6.0 |

* a molar ratio of catalyst: modified methylaluminoxane:Al compound = 1:500:285

As suggested in Table 2, it can be seen that in the copolymerization of ethylene and 1-octene, the transition metal compound according to the present invention exhibited comparable or superior activity to the transition metal catalysts of Comparative Examples 4 and 5.

Examples 9 and 10 and Comparative Example 6: Copolymerization of Ethylene and 1-Octene by Continuous Solution Polymerization Process Copolymerization of ethylene and 1-octene was carried out using a continuous polymerization apparatus as follows:

Transition metal compounds prepared in Examples 2 and 5 and Comparative Example 2 were used as catalysts, heptane was used as the solvent, and the amount of catalyst used was as described in Table 3 below. Zr represents a catalyst, and Al represents a modified methylaluminoxane (20% by weight, Nouryon), which is a cocatalyst. Each catalyst was dissolved in toluene at a concentration of 0.2 g/l and added, and synthesis was carried out using 1-octene as a comonomer. The conversion of the reactor was able to be assumed by the reaction condition and the temperature gradient in the reactor when polymerization was carried out with one polymer under each reaction condition. The molecular weight was controlled as a function of the reactor temperature and 1-octene content in the case of a single active site catalyst, and the conditions and results thereof are described in Table 3 below.

TABLE 3

| | | Example 9 | Example 10 | Comp. Example 6 |
| --- | --- | --- | --- | --- |
| Polymerization conditions | Transition metal compounds | Example 2 | Example 5 | Comp. Example 2 |
| | Total solution flow rate (kg/h) | 5 | 5 | 5 |
| | Ethylene input amount (wt %) | 8 | 8 | 8 |
| | Input molar ratio of 1-octene and ethylene (1-C8/C2) | 2.3 | 2.3 | 2.3 |

TABLE 3-continued

| | | Example 9 | Example 10 | Comp. Example 6 |
|---|---|---|---|---|
| | Zr input amount (μmol/kg) | 5.0 | 6.0 | 6.0 |
| | Al/Zr ratio | 200 | 200 | 200 |
| | Reaction temperature (° C.) | 120 | 120 | 120 |
| Polymerization results | C2 conversion (%) | 86 | 87 | 82 |
| | MI | 2.04 | 1.70 | 2.35 |
| | Density (g/cc) | 0.8699 | 0.8699 | 0.8685 |

Zr means Zr in the catalyst. Al represents the modified methylaluminoxane as a cocatalyst.

It can be seen from Table 3 that Examples 9 and 10 using the transition metal compound according to the present invention as a catalyst had better ethylene conversion, lower density, and lower MI values compared with Comparative Example 6 using the transition metal compound prepared in Comparative Example 2, such that when the transition metal compound according to the present invention is used as the catalyst, a polymer having superior physical properties and high molecular weight may be easily prepared.

Examples 11 and 12: Copolymerization of Ethylene and 1-Octene at High Temperature by Continuous Solution Polymerization Process Copolymerization of ethylene and 1-octene was carried out at high temperature using a continuous polymerization apparatus as follows:

The transition metal compound prepared in Example 2 was used as the catalyst, heptane was used as the solvent, and the amount of catalyst used was as described in Table 4 below. Zr represents a catalyst, B represents N,N-dioctadecyanilinium tetrakis (pentafluorophenyl) borate, as a cocatalyst, and Al represents triisobutyl aluminum as a cocatalyst. Each catalyst was dissolved in toluene at a concentration of 0.2 g/l and injected, and synthesis was carried out using 1-octene as a comonomer. The conversion of the reactor was able to be assumed by the reaction condition and the temperature gradient in the reactor when polymerization was carried out with one polymer under each reaction condition. The molecular weight was controlled as a function of the reactor temperature and 1-octene content in the case of a single active site catalyst, and the conditions and results thereof are described in Table 4 below.

TABLE 4

| | | Example 11 | Example 12 |
|---|---|---|---|
| Polymerization conditions | Transition metal compounds | Example 2 | Example 2 |
| | Total solution flow rate (kg/h) | 5 | 5 |
| | Ethylene input amount (wt %) | 10 | 10 |
| | Input molar ratio of octene and ethylene (1-C8/C2) | 0.8 | 0.5 |
| | Zr input amount (μmol/kg) | 4.5 | 5.1 |
| | B/Zr ratio | 6.7 | 5.9 |
| | Al/Zr ratio | 66.7 | 58.8 |
| | Reaction temperature (° C.) | 180.5 | 190.7 |
| Polymerization results | C2 conversion (%) | 85 | 85 |
| | MI | 17.5 | 17.3 |
| | Density (g/cc) | 0.9115 | 0.927 |

Zr means Zr in the catalyst. B represents N,N-dioctadecyltetraoctylanilinium tetrakis (pentafluorophenyl) borate as a cocatalyst.

Al represents triisobutylaluminum as a cocatalyst.

It can be seen from Table 4 that Examples 11 and 12 using the transition metal compound according to the present invention as the catalyst have excellent catalytic activity even at high temperatures, such that when the transition metal compound according to the present invention is used as the catalyst, the polymerization reaction may be carried out more easily under various reaction conditions.

As described above, though the present invention has been described in detail with respect to the exemplary embodiments thereof, a person skilled in the art may make various variations of the present invention without departing from the spirit and the scope of the present invention. Therefore, further modifications in the embodiments of the present invention will not deviate from the technology of the present invention.

The invention claimed is:

1. A transition metal compound represented by the following Formula 1:

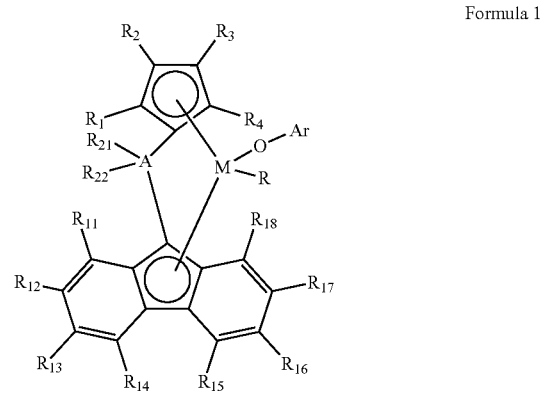

Formula 1 wherein:
M is a transition metal of Group 4 in the periodic table;
A is C or Si;
Ar is a substituted aryl, and the substituent of the aryl is one or more selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, and (C6-C20)arylthio, wherein the substituted aryl has 14 or more carbon atoms;
R is (C1-C20)alkyl, (C1-C20)alkoxy, (C6-C20)aryl, or (C6-C20)aryloxy;
$R_1$ to $R_4$ are each independently hydrogen or (C1-C20) alkyl;

R₁₁ to R₁₈ are each independently hydrogen, (C1-C20)alkyl, (C1-C20)alkoxy, (C3-C20)cycloalkyl, (C6-C20)aryl, (C6-C20)aryl(C1-C20)alkyl, (C1-C20)alkyl(C6-C20)aryl, (C1-C20)alkylsilyl, or (C6-C20)arylsilyl, or each substituent may be linked to an adjacent substituent via (C3-C12)alkylene or (C3-C12)alkenylene with or without a fused ring to form an alicyclic ring, or a monocyclic or polycyclic aromatic ring;

R₂₁ and R₂₂ are each independently (C6-C20)aryl; and the alkyl, alkoxy, aryl and aryloxy of R, alkyl, the alkoxy, cycloalkyl, aryl, arylalkyl, alkylaryl, alkylsilyl, arylsilyl, alicyclic ring or aromatic ring of R₁₁ to R₁₈, and the aryl of R₂₁ and R₂₂ may be further substituted with one or more substituents selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20)alkylphosphine, and (C6-C20)arylphosphine.

2. The transition metal compound of claim 1, wherein in Formula 1, Ar is a (C6-C20)aryl substituted with an alkyl having 8 or more carbon atoms; and
R is (C1-C20)alkyl, (C1-C20)alkyl(C6-C20)aryloxy, or (C6-C20)aryl(C1-C20)alkyl.

3. The transition metal compound of claim 1, wherein in Formula 1, M is titanium, zirconium, or hafnium;
each R is independently (C1-C4)alkyl, (C8-C20)alkyl (C6-C12)aryloxy, or (C6-C12)aryl(C1-C4)alkyl;
R₁ to R₄ are each independently hydrogen or (C1-C4) alkyl; and
R₁₁ to R₁₈ are hydrogen.

4. The transition metal compound of claim 1, wherein the transition metal compound of Formula 1 is represented by the following Formula 2 or 3:

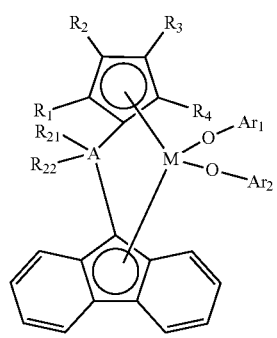

Formula 2

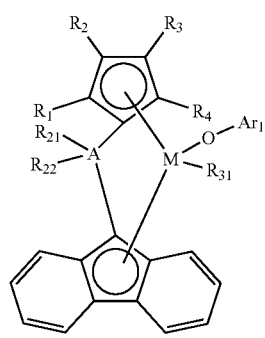

Formula 3 wherein:

M is titanium, zirconium, or hafnium;

Ar₁ and Ar₂ are each independently substituted (C6-C20)aryl, wherein the substituent of the (C6-C20) aryl is (C1-C20)alkyl, (C3-C20)cycloalkyl, (C6-C20)aryl, (C6-C20)aryl(C1-C20)alkyl, (C1-C20) alkoxy, (C6-C20)aryloxy, (C1-C20)alkylamino, (C6-C20)arylamino, (C1-C20)alkylthio, or (C6-C20) arylthio, wherein the substituted (C6-C20)aryls have 14 or more carbon atoms;

A is C or Si;

R₁ to R₄ are each independently hydrogen or (C1-C4) alkyl;

R₂₁ and R₂₂ are each independently (C6-C20)aryl or (C6-C20)aryl substituted with (C1-C4)alkyl; and R₃₁ is (C1-C20)alkyl or (C6-C20)aryl(C1-C20)alkyl.

5. The transition metal compound of claim 1, wherein the transition metal compound is selected from the following compounds:

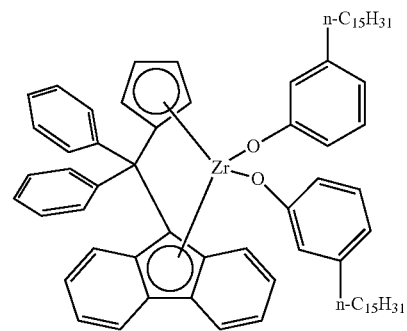

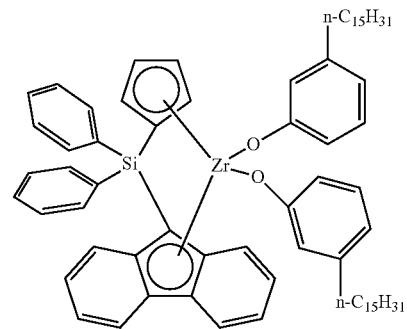

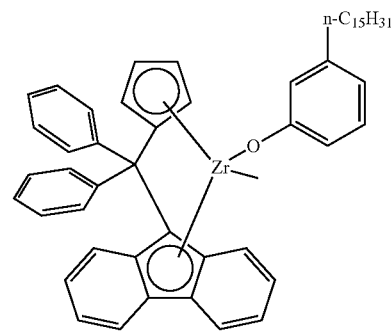

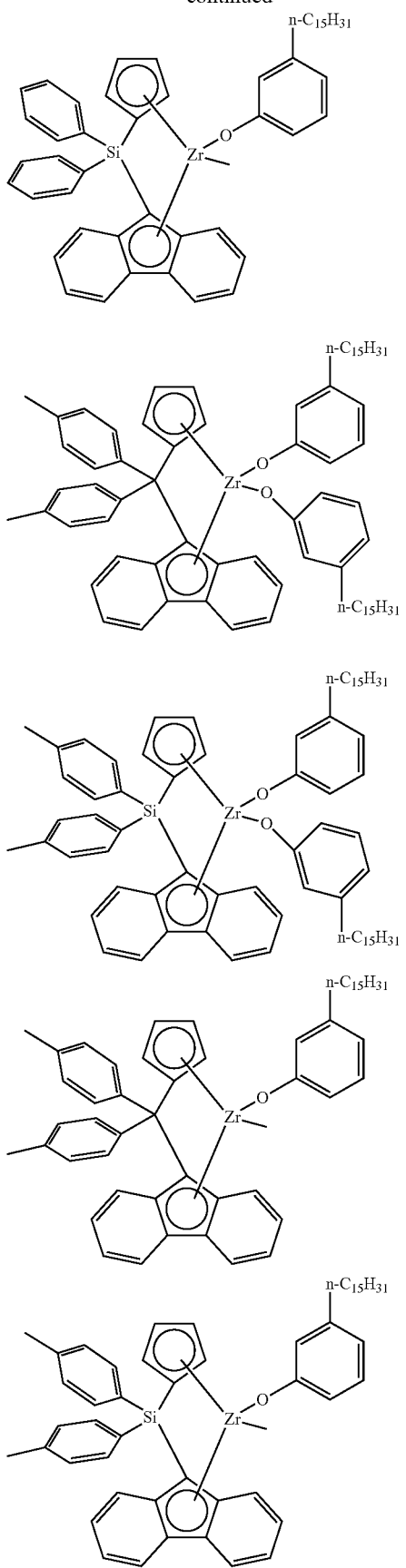
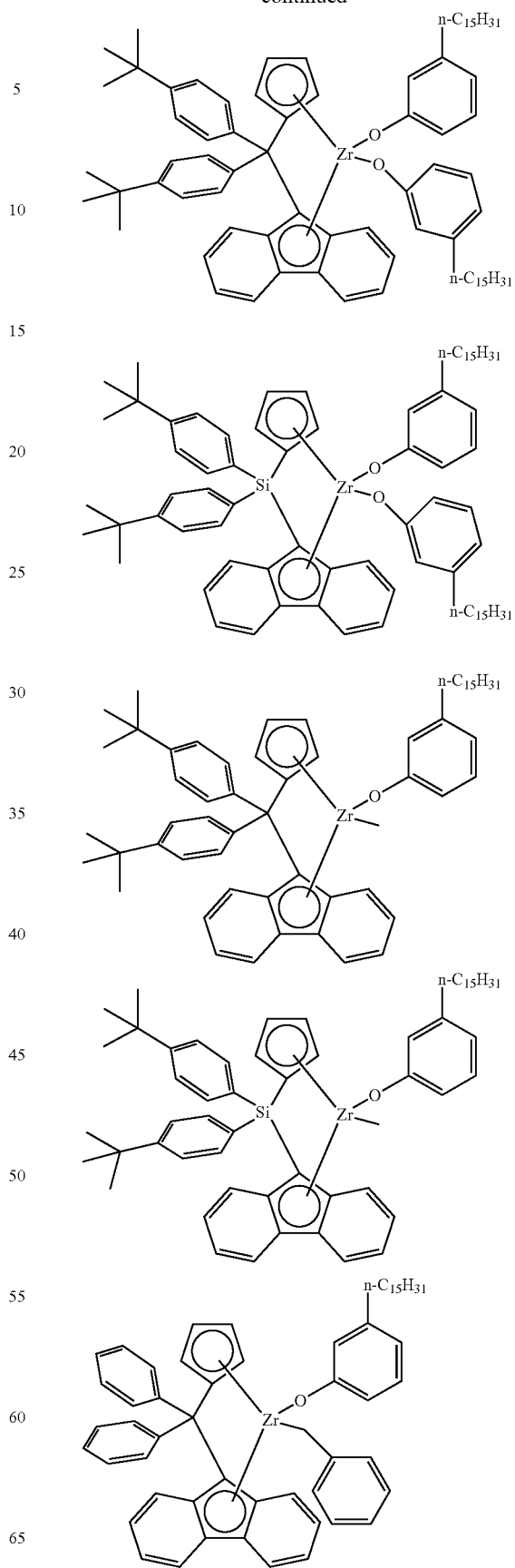

-continued
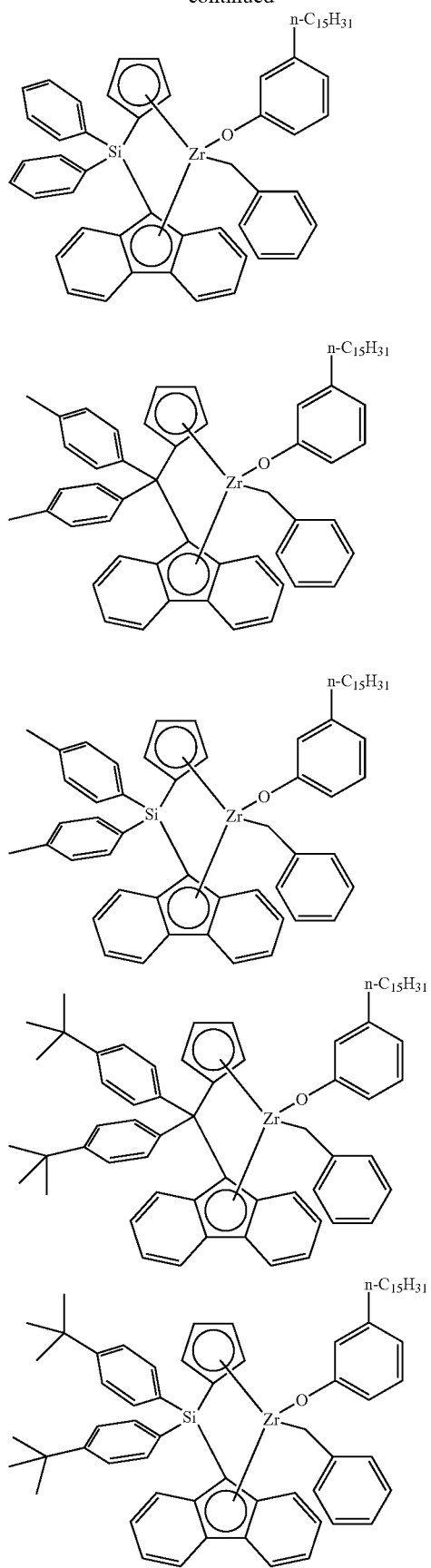
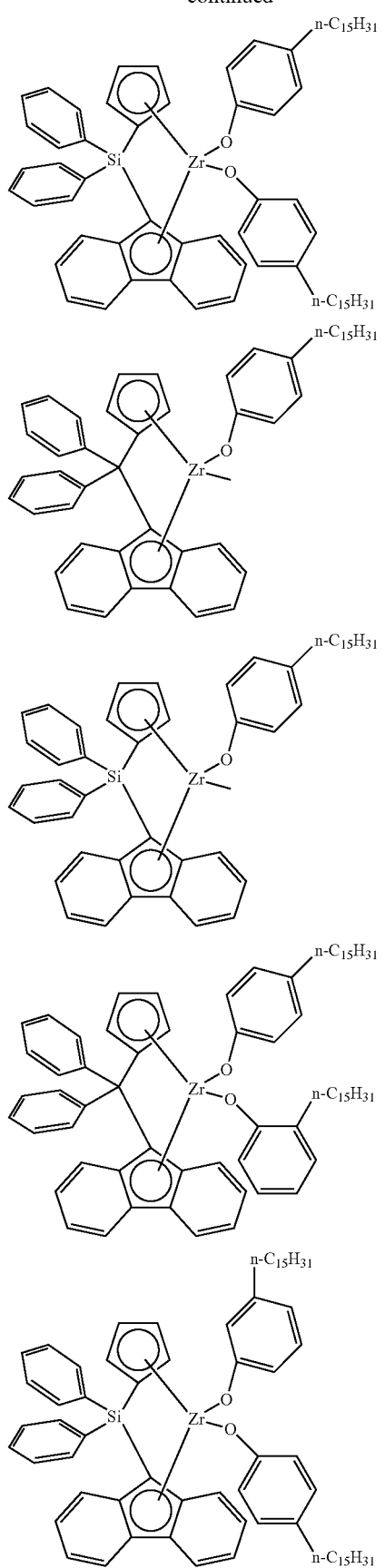

-continued

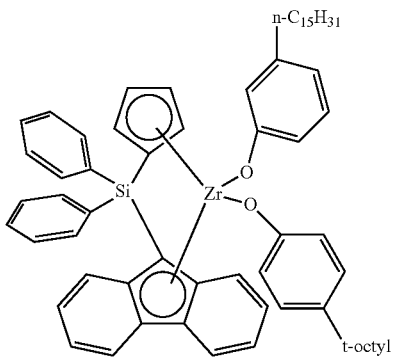

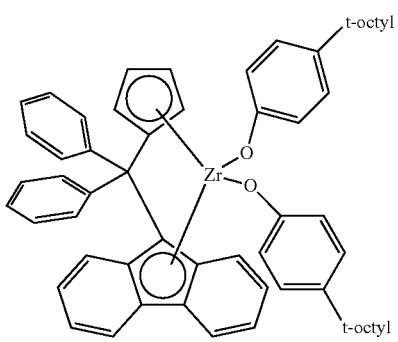

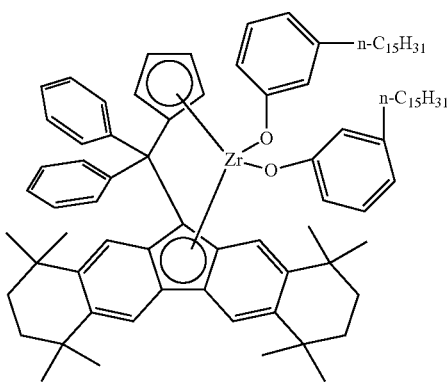

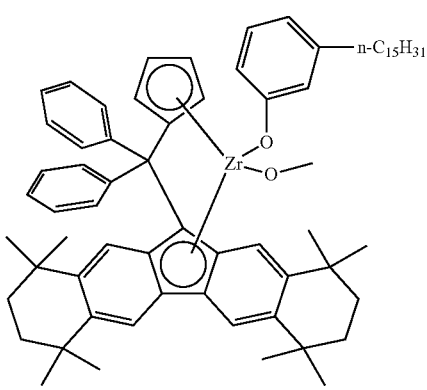

-continued

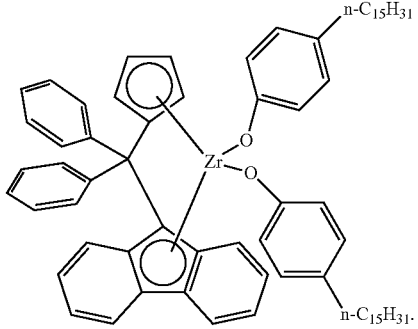

6. The transition metal compound of claim 1, wherein the transition metal compound has a solubility of 1% by weight or more in methylcyclohexane at 25° C.

7. A transition metal catalyst composition for preparing a homopolymer ethylene or a copolymer of ethylene and alpha-olefin, comprising:
 a transition metal compound represented by the following Formula 1; and
 a cocatalyst;

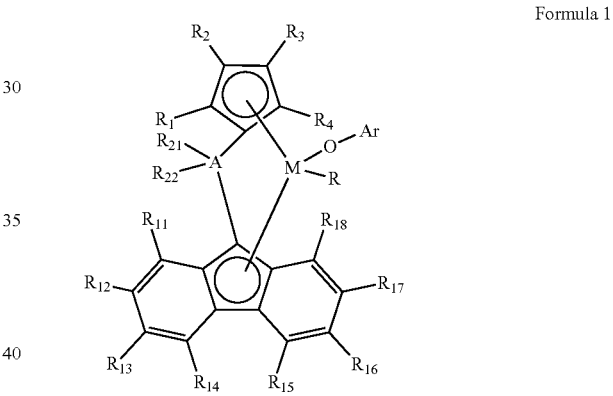

Formula 1 wherein:
 M is a transition metal of Group 4 in the periodic table;
 A is C or Si;
 Ar is a substituted aryl, and the substituent of the aryl is one or more selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, and (C6-C20)arylthio, wherein the substituted aryl has 14 or more carbon atoms;
 R is (C1-C20)alkyl, (C1-C20)alkoxy, (C6-C20)aryl, or (C6-C20)aryloxy;
 $R_1$ to $R_4$ are each independently hydrogen or (C1-C20)alkyl;
 $R_{11}$ to $R_{18}$ are each independently hydrogen, (C1-C20)alkyl, (C1-C20)alkoxy, (C3-C20)cycloalkyl, (C6-C20)aryl, (C6-C20)aryl(C1-C20)alkyl, (C1-C20)alkyl(C6-C20)aryl, (C1-C20)alkylsilyl, or (C6-C20)arylsilyl, or each substituent may be linked to an adjacent substituent via (C3-C12)alkylene or (C3-C12)alkenylene with or without a fused ring to form an alicyclic ring, or a monocyclic or polycyclic aromatic ring;

$R_{21}$ and $R_{22}$ are each independently (C6-C20)aryl; and
the alkyl, alkoxy, aryl and aryloxy of R, the alkyl, alkoxy, cycloalkyl, aryl, arylalkyl, alkylaryl, alkylsilyl, arylsilyl, alicyclic ring or aromatic ring of $R_{11}$ to $R_{18}$, and the aryl of $R_{21}$ and $R_{22}$ may be further substituted with one or more substituents selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20)alkylphosphine, and (C6-C20)arylphosphine.

8. The transition metal catalyst composition of claim 7, wherein the cocatalyst is an aluminum compound cocatalyst, a boron compound cocatalyst, or a mixture thereof.

9. A method for preparing an olefin polymer, the method comprising:
obtaining an olefin polymer by solution polymerization of one or two or more monomers selected from ethylene and a comonomer in the presence of a transition metal compound represented by the following Formula 1, a cocatalyst, and a non-aromatic hydrocarbon solvent:

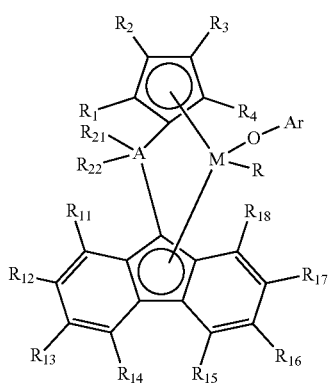

Formula 1 wherein:
M is a transition metal of Group 4 in the periodic table;
A is C or Si;
Ar is a substituted aryl, and the substituent of the aryl is one or more selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C1-C20)alkylamino, (C6-C20)arylamino, (C1-C20)alkylthio, and (C6-C20)arylthio, wherein the substituted aryl has 14 or more carbon atoms;
R is (C1-C20)alkyl, (C1-C20)alkoxy, (C6-C20)aryl, or (C6-C20)aryloxy;
$R_1$ to $R_4$ are each independently hydrogen or (C1-C20)alkyl;
$R_{11}$ to $R_{18}$ are each independently hydrogen, (C1-C20)alkyl, (C1-C20)alkoxy, (C3-C20)cycloalkyl, (C6-C20)aryl, (C6-C20)aryl(C1-C20)alkyl, (C1-C20)alkyl(C6-C20)aryl, (C1-C20)alkylsilyl, or (C6-C20)arylsilyl, or each of the substituents may be linked to an adjacent substituent via (C3-C12)alkylene or (C3-C12)alkenylene with or without a fused ring to form an alicyclic ring, or a monocyclic or polycyclic aromatic ring;
$R_{21}$ and $R_{22}$ are each independently (C6-C20)aryl; and
the alkyl, alkoxy, aryl and aryloxy of R, the alkyl, alkoxy, cycloalkyl, aryl, arylalkyl, alkylaryl, alkylsilyl, arylsilyl, alicyclic ring or aromatic ring of $R_{11}$ to $R_{18}$, and the aryl of $R_{21}$ and $R_{22}$ may be further substituted with one or more substituents selected from the group consisting of (C1-C20)alkyl, (C3-C20)cycloalkyl, (C6-C20)aryl, (C6-C20)aryl(C1-C20)alkyl, (C1-C20)alkoxy, (C6-C20)aryloxy, (C3-C20)alkylsiloxy, (C6-C20)arylsiloxy, (C1-C20)alkylamino, (C6-C20)arylamino, (C1-C20)alkylthio, (C6-C20)arylthio, (C1-C20)alkylphosphine, and (C6-C20)arylphosphine.

10. The method of claim 9, wherein the non-aromatic hydrocarbon solvent is one or two or more selected from the group consisting of methylcyclohexane, cyclohexane, n-heptane, n-hexane, n-butane, isobutane, n-pentane, n-octane, isooctane, nonane, decane, and dodecane.

11. The method of claim 9, wherein the transition metal compound has a solubility of 1% by weight or more in the non-aromatic hydrocarbon solvent at 25° C.

12. The method of claim 9, wherein the cocatalyst is an aluminum compound cocatalyst, a boron compound cocatalyst, or a mixture thereof.

13. The method of claim 12, wherein the boron compound cocatalyst is a compound represented by the following Formulas 11 to 14

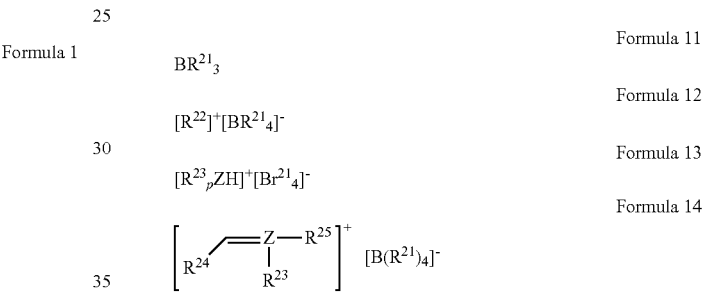

wherein B is a boron atom; $R^{21}$ is a phenyl group, and the phenyl group may be further substituted with 3 to 5 substituents selected from the group consisting of a fluorine atom, a (C1-C20)alkyl group, a (C1-C20)alkyl group substituted with a fluorine atom, a (C1-C20)alkoxy group, or a (C1-C20)alkoxy group substituted with a fluorine atom; $R^{22}$ is a (C5-C7) aromatic radical, a (C1-C20)alkyl(C6-C20)aryl radical or a (C6-C20)aryl(C1-C20)alkyl radical; Z is nitrogen or phosphorus atom; $R^{23}$ is a (C1-C20)alkyl radical or an anilinium radical substituted with two (C1-C10)alkyl groups together with a nitrogen atom; $R^{24}$ is a (C5-C20)alkyl group; $R^{25}$ is a (C5-C20)aryl group or a (C1-C20)alkyl (C6-C20)aryl group; and p is an integer of 2 or 3;

and the aluminum compound cocatalyst is a compound represented by the following Formulas 15 to 19:

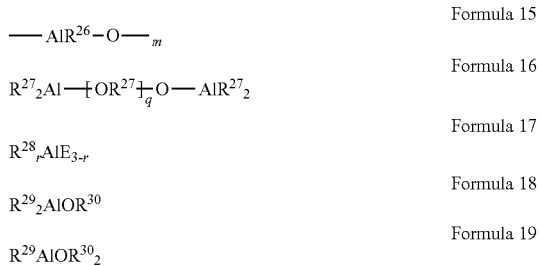

wherein $R^{26}$ and $R^{27}$ are each independently a (C1-C20) alkyl group; m and q are integers of 5 to 20; $R^{28}$ and $R^{29}$ are each independently a (C1-C20)alkyl group; E is a hydrogen atom or a halogen atom; r is an integer of 1 to 3; and $R^{30}$ is a (C1-C20)alkyl group or a (C6-C30) aryl group.

14. The method of claim 9, wherein the solution polymerization is carried out at an ethylene monomer pressure of 6 to 150 atm and a polymerization temperature of 100 to 200° C.

15. The method of claim 9, wherein the olefin polymer has a weight average molecular weight of 5,000 to 200,000 g/mol and a molecular weight distribution (Mw/Mn) of 1.0 to 10.0.

16. The method of claim 9, wherein the olefin polymer has an ethylene content of 30 to 99% by weight.

* * * * *